United States Patent
Sandoz et al.

(10) Patent No.: US 8,720,230 B2
(45) Date of Patent: May 13, 2014

(54) METHOD FOR FABRICATING AN OPTICAL FIBER PREFORM

(75) Inventors: Frédéric Sandoz, Cortaillod (CH); Carlos Pedrido, Boudry (CH); Philippe Ribaux, Bevaix (CH); Philippe Hamel, St-Aubin Sauges (CH); Peter Othenin, Yverdon-les-Bains (CH); Philippe Vincent Roy, Limoges (FR); Methiew Devautour, Limoges (FR)

(73) Assignee: Silitec Fibers SA, Boudry (CH)

( * ) Notice: Subject to any disclaimer, the term of this patent is extended or adjusted under 35 U.S.C. 154(b) by 668 days.

(21) Appl. No.: 12/517,339

(22) PCT Filed: Dec. 7, 2007

(86) PCT No.: PCT/EP2007/063519
§ 371 (c)(1),
(2), (4) Date: Jun. 2, 2009

(87) PCT Pub. No.: WO2008/068331
PCT Pub. Date: Jun. 12, 2008

(65) Prior Publication Data
US 2010/0000260 A1  Jan. 7, 2010

(30) Foreign Application Priority Data
Dec. 7, 2006 (EP) .................................. 06125655

(51) Int. Cl.
*C03B 37/075* (2006.01)

(52) U.S. Cl.
USPC ........................................................ 65/399

(58) Field of Classification Search
USPC ........................................................ 65/399
See application file for complete search history.

(56) References Cited

U.S. PATENT DOCUMENTS

| 5,572,618 | A | 11/1996 | Digiovanni et al. |
| 5,907,652 | A | 5/1999 | Digiovanni et al. |
| 6,334,019 | B1 | 12/2001 | Birks et al. |
| 6,723,435 | B1 | 4/2004 | Horne et al. |
| 2001/0027159 | A1* | 10/2001 | Kaneyoshi ............ 501/152 |
| 2003/0026565 | A1* | 2/2003 | Anderson et al. ......... 385/123 |
| 2004/0005127 | A1 | 1/2004 | Kliner et al. |
| 2004/0050110 | A1 | 3/2004 | Berkey et al. |

(Continued)

FOREIGN PATENT DOCUMENTS

| GB | 2 176 472 A | 12/1986 |
| JP | 58 069738 A | 4/1983 |

(Continued)

OTHER PUBLICATIONS

"A novel technique for active fibre production", Ruth Renner-Emy., Loredana Di Labio, Willy Lüthy Optical Materials No. 29 Mar. 2006 pp. 919-922 XP002477508.

(Continued)

*Primary Examiner* — Queenie Dehghan
(74) *Attorney, Agent, or Firm* — Oliff PLC

(57) ABSTRACT

The present invention relates to a method and an apparatus for fabricating a preform (1,10,100) that can be used for drawing an active optical fiber (8). The present invention further relates to an active optical fiber (8), designed for amplification or attenuation purposes, drawn from said preform (1,10,100) and to an optical amplifier (600, 601) using a laser active optical fiber.

5 Claims, 13 Drawing Sheets

(56) References Cited

U.S. PATENT DOCUMENTS

| | | | |
|---|---|---|---|
| 2005/0079288 A1* | 4/2005 | Cornelius et al. | 427/180 |
| 2005/0105867 A1 | 5/2005 | Koch et al. | |
| 2006/0098694 A1 | 5/2006 | Hongo | |
| 2006/0120678 A1 | 6/2006 | Manyam et al. | |
| 2006/0213228 A1* | 9/2006 | Schotz et al. | 65/377 |

FOREIGN PATENT DOCUMENTS

| | | |
|---|---|---|
| WO | WO98/58884 A1 | 12/1998 |
| WO | WO 03/010578 A | 2/2003 |
| WO | WO2005/102947 A1 | 3/2003 |
| WO | WO2005/102946 A2 | 11/2005 |
| WO | WO2005/102947 A2 | 11/2005 |

OTHER PUBLICATIONS

"Fabrication of fibers with high rare-earth concentrations for Faraday isolator applications", John Ballato and Elias Snitzer, Oct. 1995.

"Distribution of Spontaneous Emission from an ER3 + doped photonic Crystal Fiber", R. F. Cregan, et al., Journal of Lightwave Technology vol. 17, No. 11, 1999 2138-2141 XP011029553.

Schreiber T et al: "High power photonic crystal fiber laser systems", Transparent Opticai Networks, 2004. Proceedings of 2004 6th International Conference on Warsaw, Poiand Jul. 4-8, 2004, Piscataway, NJ, USA,IEEE, vol. 1, Jul. 4, 2004, pp. 131-135, XP010743461 ISBN: 0-7803-8343-5.

"Rare Earth Doped Fiber Fabrication: Techniques and physical properties", Jay R. Simpson, "Rare-earth-doped fiber lasers and amplifiers" Second edition, edited by Michel J.F. Digonet ISBN 0-8247-0458-4, Copyright Marcell Dekker, 2001.

"Introductory university optics", J. Beynon, 1996 ISBN 0-13-210824-0, pp. 231-247, copyright Prentice Hall Europe.

"Handbook of Photonics", Mool, C. Gupta, Editor in Chief. ISBN0-8493-8909-7, pp. 445-450, copyright CRC Press, 1997.

* cited by examiner

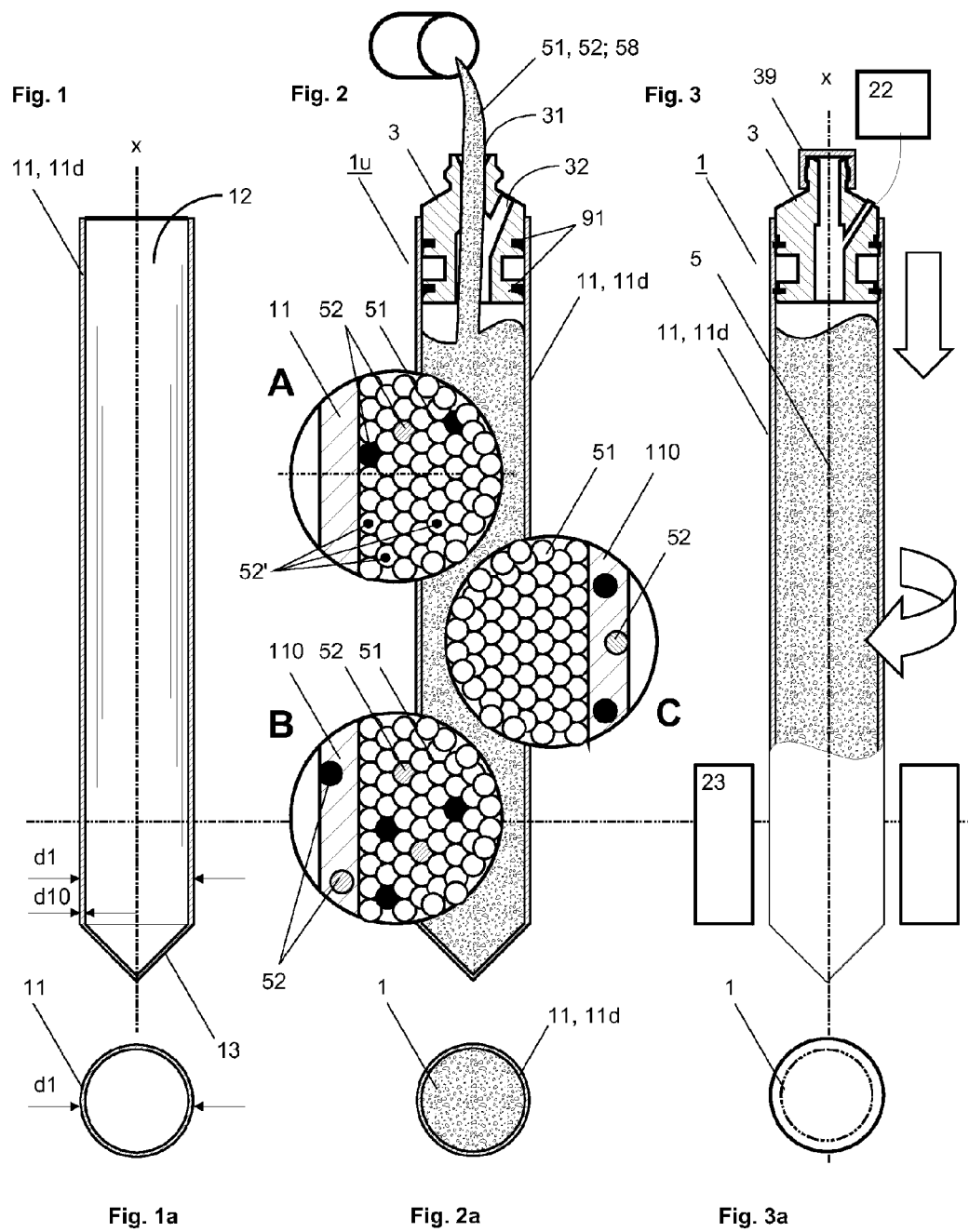

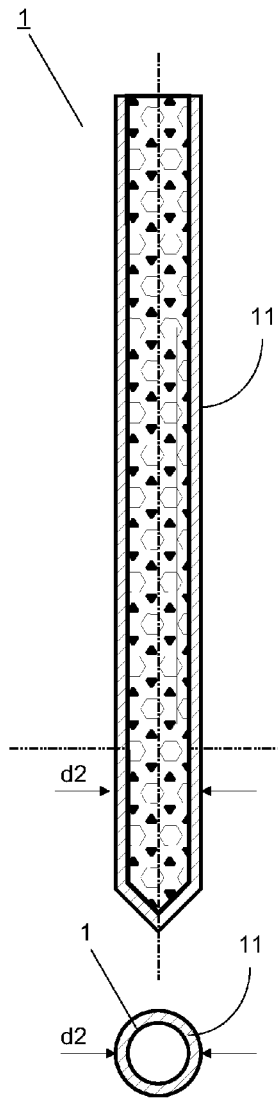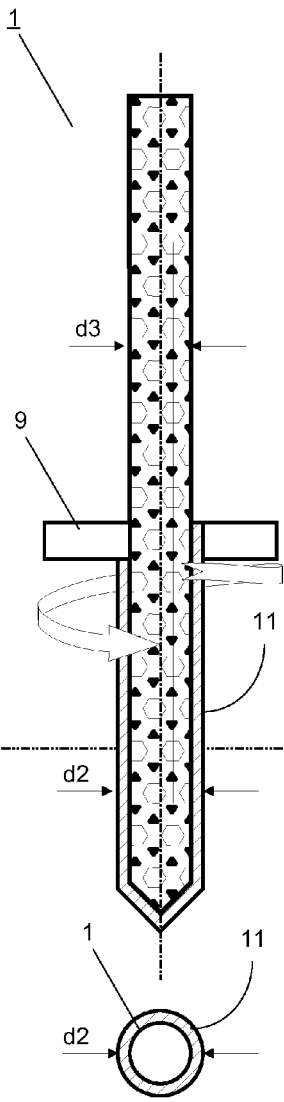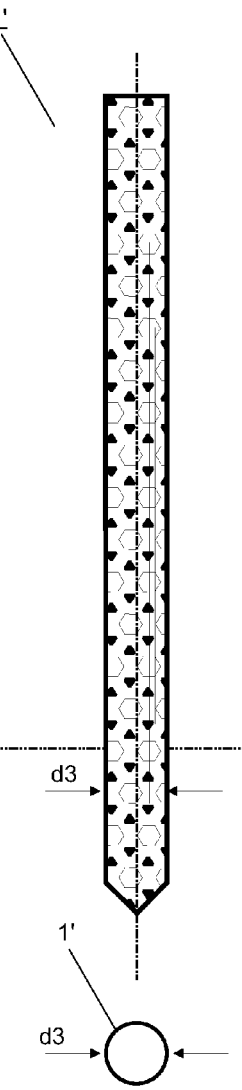

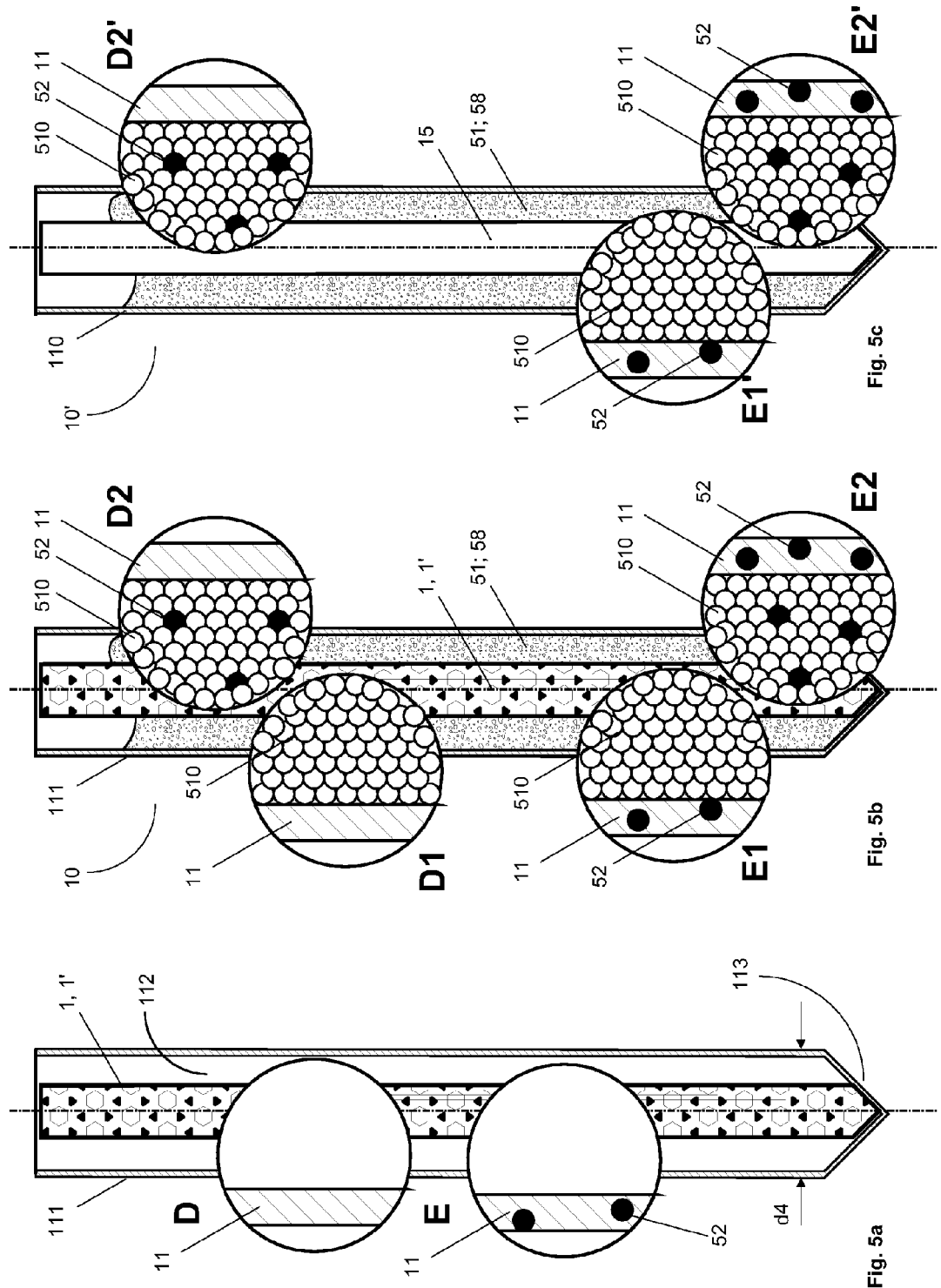

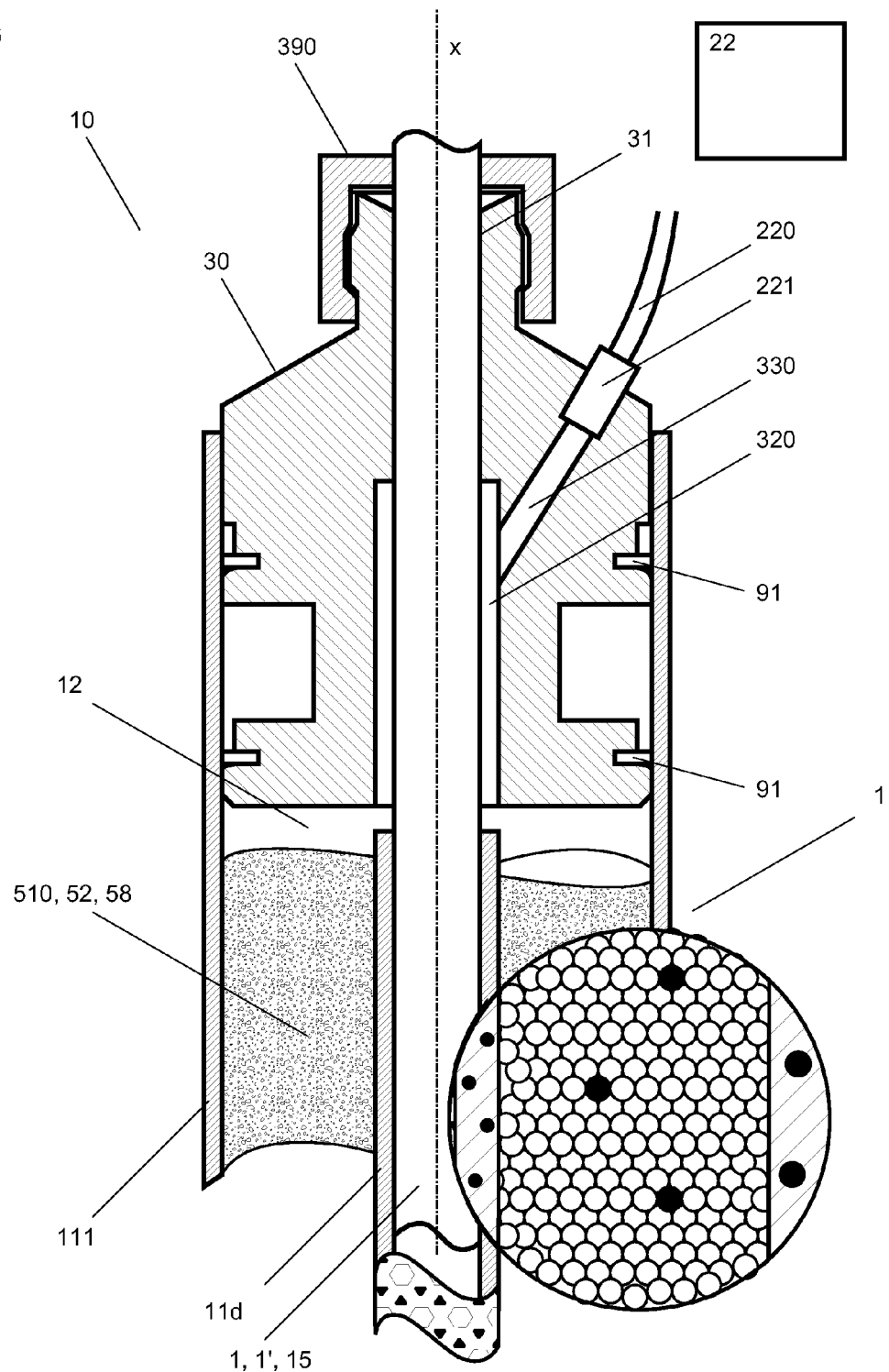

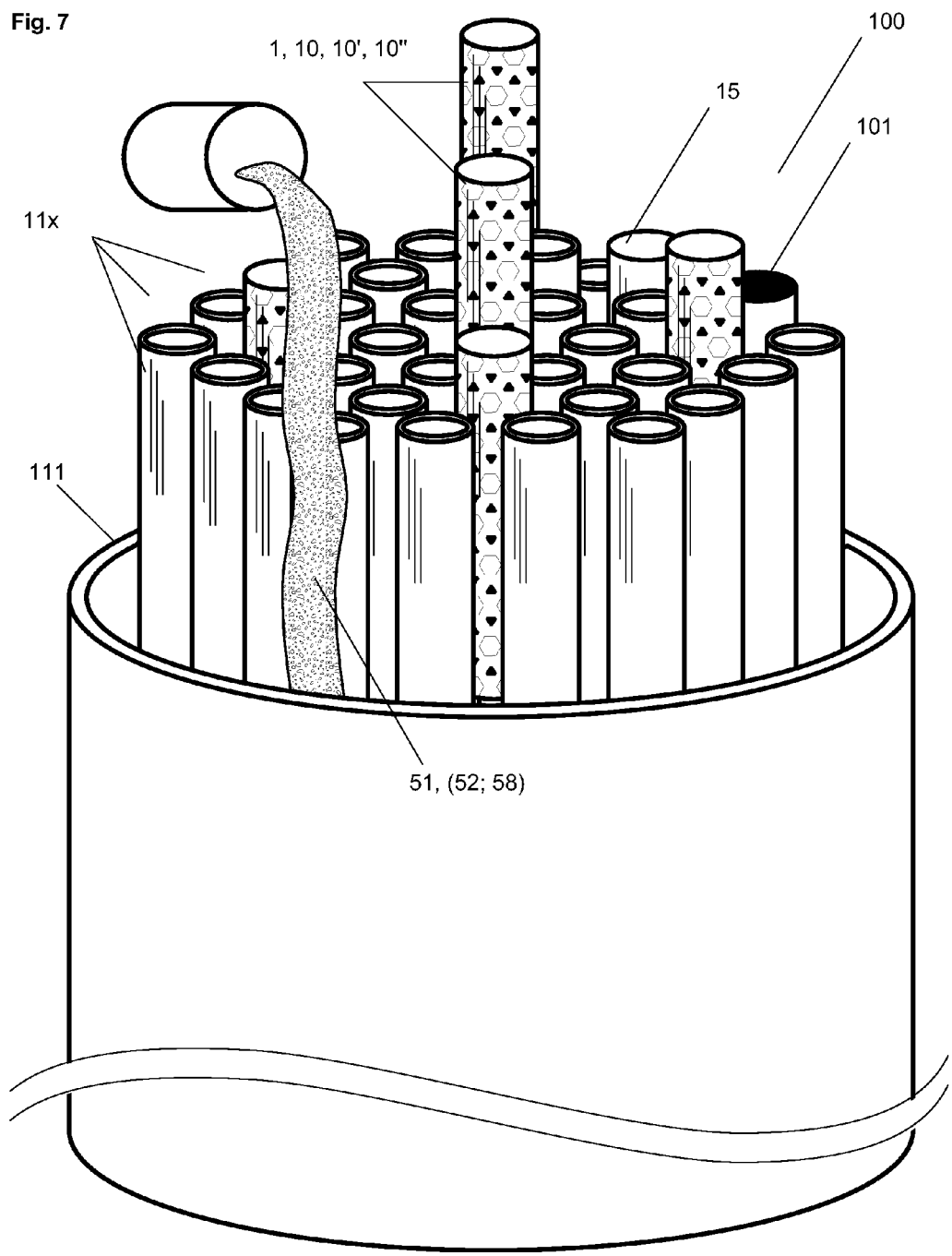

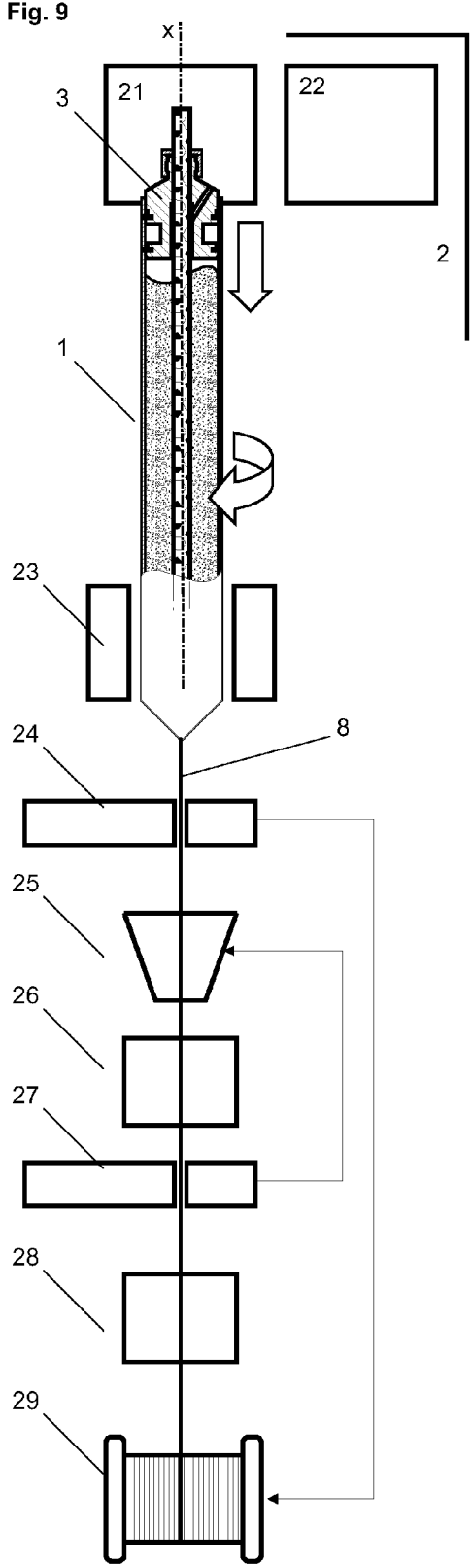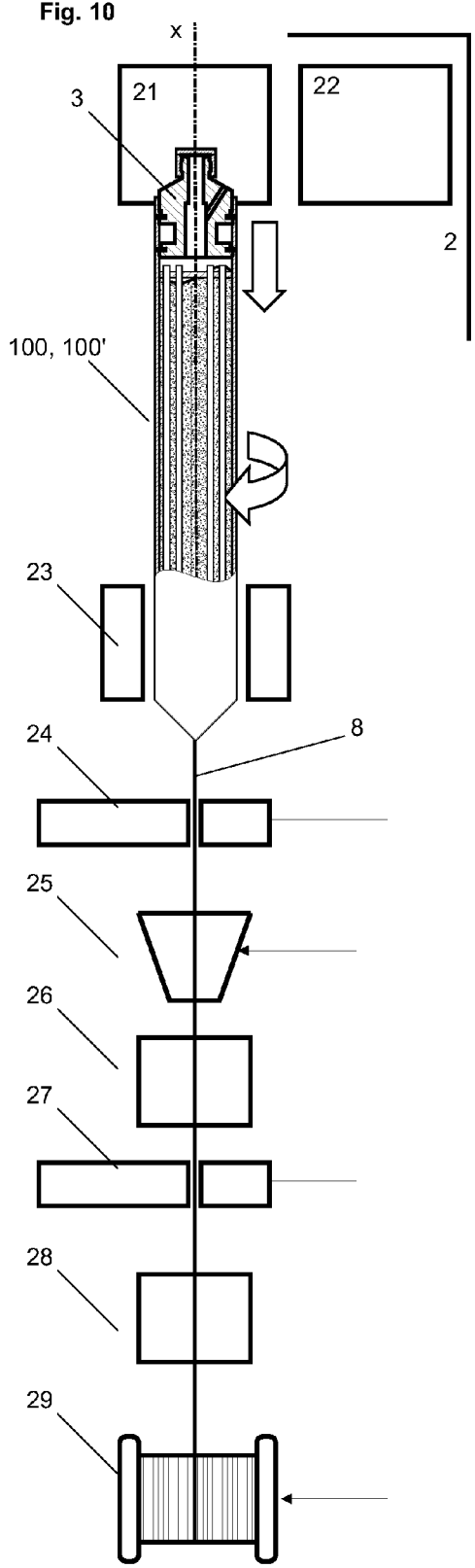

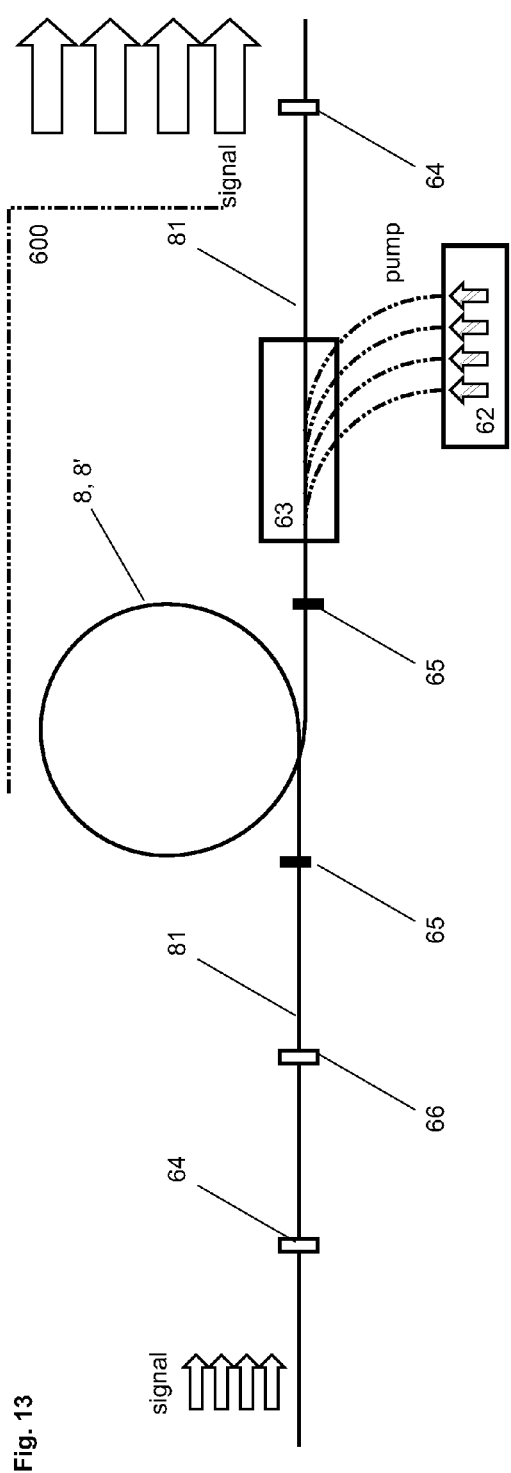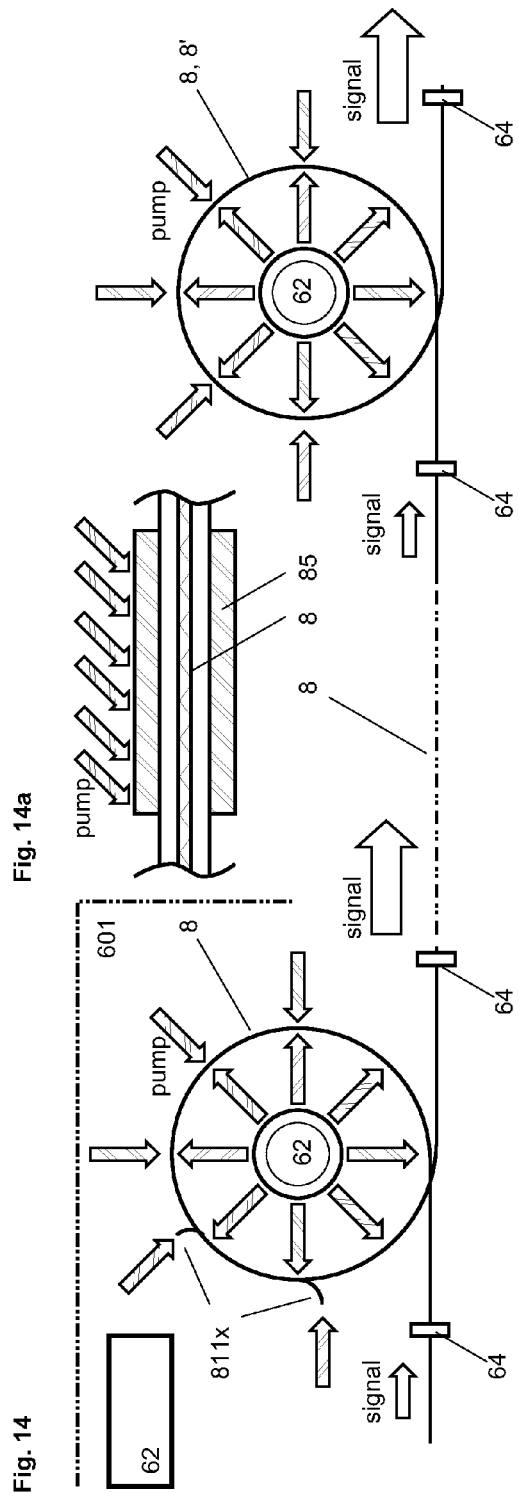

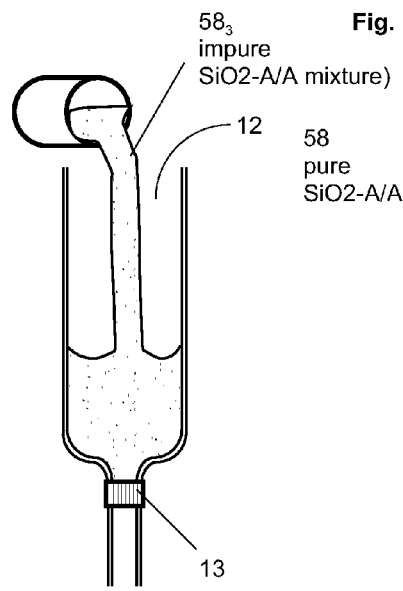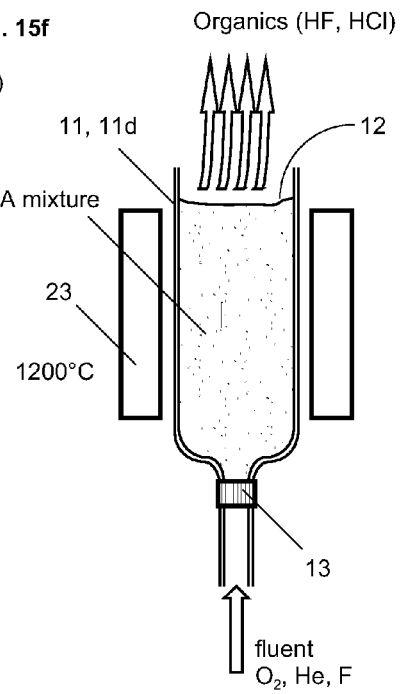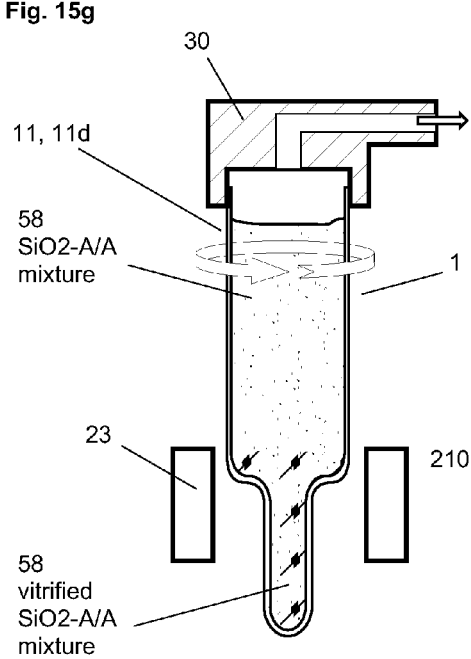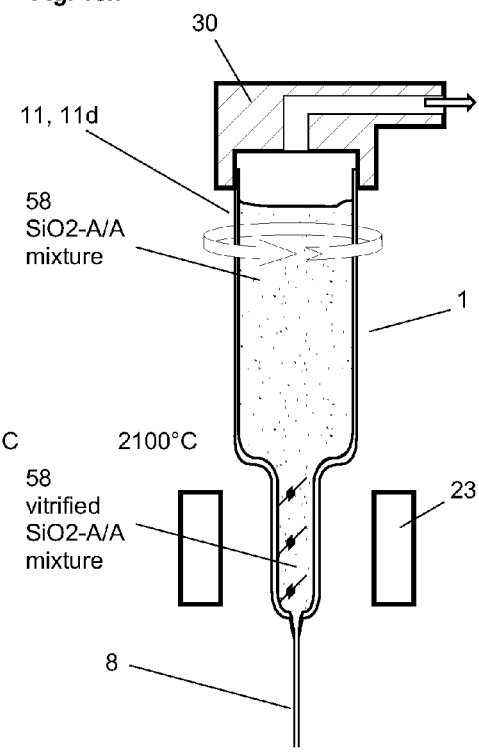

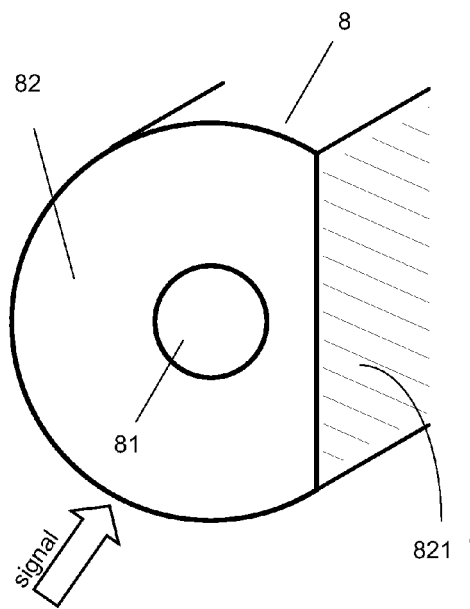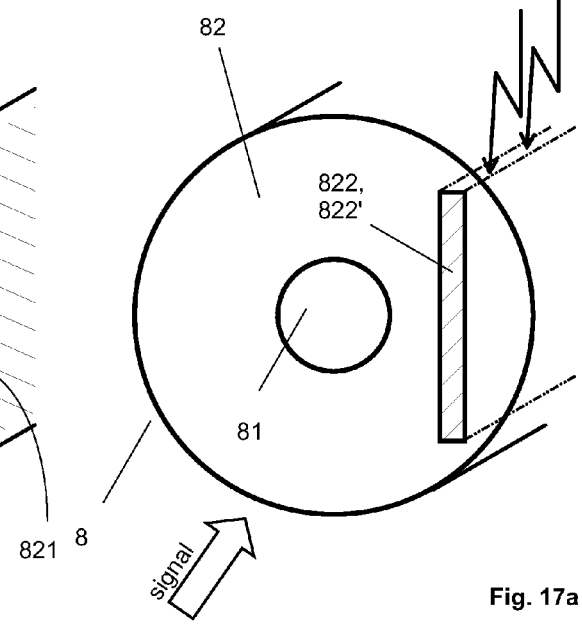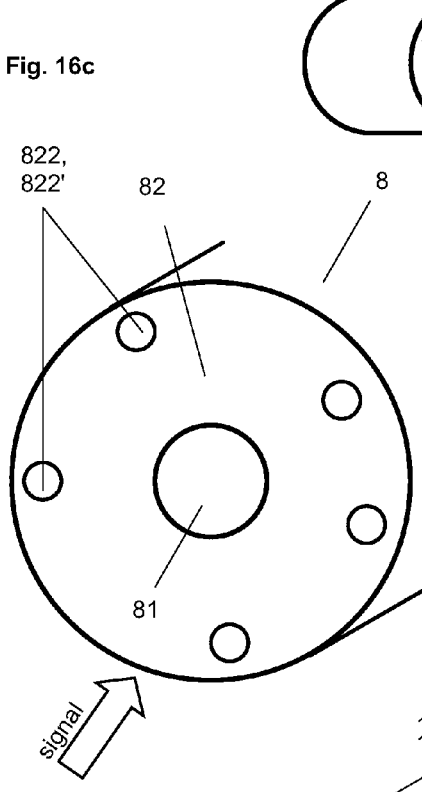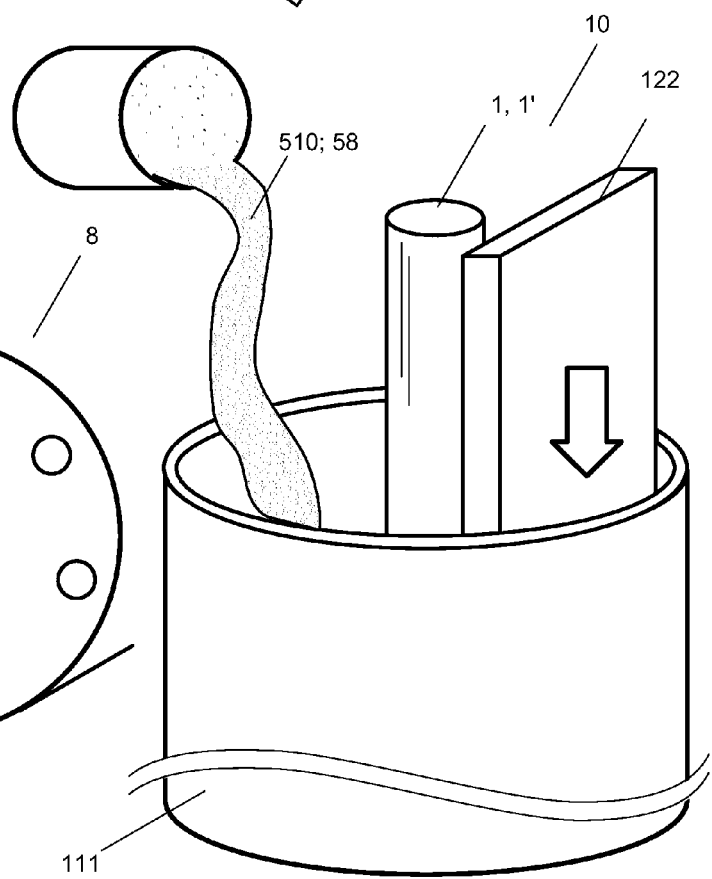

METHOD FOR FABRICATING AN OPTICAL FIBER PREFORM

The present invention relates to a method for fabricating a primary, secondary or higher order preform that can be used for drawing an active optical fiber that allows amplification or attenuation of an optical signal. The present invention further relates to a preform, an active optical fiber drawn from said preform and to an optical amplifier using said optical fiber.

Fabrication of optical fibers, such as the fibers currently used in ultra high speed data communication networks, is described in [1], Mool C. Gupta, Handbook of PHOTONICS, CRC Press, 1997 Boca Raton, chapter 10.7, pages 445-449. Main process steps of optical fiber fabrication are fabricating a preform, drawing the fiber from the preform and coating the fiber with a material that protects the fiber from handling and from environmental influences.

In the drawing process, the preform is fed from above into the drawing portion of a furnace while being drawn from the bottom using tractors. The fiber is then wound onto a drum while being monitored for tensile strength. The temperature during draw is in the range of 2000° C. After exiting the furnace the fiber is coated with a UV-curable coating before winding on the drum.

Further, according to [1], pages 449-450, an important aspect of optical fiber research is rare-earth doping for amplification and lasing. Below in place of the term rare earth the acronym RE is used.

In an optical amplifier, an RE-doped fiber with lengths in the order of meters and dopant levels on the order of 2 ppm, is spliced to a wavelength-dependent, fiber-optic coupler. The coupler enables one to continuously pump the erbium-doped fiber with light emitted from a high-power semiconductor laser diode at 980 or 1480 nm. Filters and optical isolators are often included to minimize spontaneous emission noise and reflections. The pump light is used to excite ions from the ground state to an excited state. Signal light entering the fiber initiates stimulated emission and is coherently amplified. Technical issues such as wavelength dependence of gain, gain saturation, polarization dependence and spontaneous emission, among others, have been carefully studied. Spontaneous emission occurs when ions in the excited state spontaneously relax to the ground state contributing to noise thus affecting the signal-to-noise ratio of an amplifier-based communication system. Another important parameter of the optical amplifier is the concentration of RE ions. An optimum concentration of RE ions avoids ion clustering which alters the excited states and results in elevating one ion to a higher state and emission to the ground of neighbouring ions. Hence a higher concentration of RE-ions does not necessarily provide higher gain and reduced signal to noise. Further, the location of the RE-ions within the core is also relevant.

If the intensity of radiation of a frequency f incident on a material is $I_0$ then the intensity I at the depth x inside the material is given by $I=I_0 e^{-ax}$ (see [2], John Beynon, Introductory University Optics, Prentice Hall 1996, page 231). This formula is of interest for considerations concerning pumping procedures. Manufacturing processes are therefore critical in view of obtaining high performance active fibers that can be applied in laser systems and/or optical amplifiers as shown in [1], page 450 or [2], page 247.

According to [3], Michel J. F. Digonnet, Rare-Earth-Doped Fiber Lasers and Amplifiers, $2^{nd}$ Edition, Marcel Dekker Inc. 2001, Chapter 1.4 standard methods of fabricating doped silica fiber fall into two basic categories, both based on the reaction of halides, such as $SiCl_4$, $GeCl_4$, $POCl_4$, $SiF_4$ and $BCl_4$, to form the desired mix of oxides. Processes according to category 1 react in a hydrogen flame and collect the resulting soot on a mandrel for subsequent sintering to a transparent glass. Processes based on this method are commonly referred to as Vapour Axial Deposition (VAD) and Outside Vapour Deposition (OVD). Processes according to category 2 react the chlorides inside a substrate tube that becomes part of the cladding, reacting, depositing or sintering simultaneously, as a torch plasma fireball or microwave cavity traverses the tube. Processes based on this method are referred to as Modified Chemical Vapour Deposition (MCVD), Plasma Chemical Vapour Deposition (PCVD), and Intrinsic Microwave Chemical Vapour Deposition (IMCVD).

According to [3], page 5, chapter 1.4.2, methods to deliver RE-vapour species to the reaction/deposition zone of a preform process have been devised for both of the above mentioned process categories. [3], page 6, FIG. 2 shows MCVD processes, in which RE-dopants are delivered to an oxidation region along with other index controlling dopants. The low vapour pressure RE-reactant is accommodated either by taking the RE-vapour source close to the reaction zone and immediately diluting it with other reactants or by delivering the RE-dopants together with material in an aerosol or higher vapour pressure compound to the reaction zone.

Further processes for producing conventional optical fibers and photonic crystal fibers are disclosed in [4], WO 2005/102946 A1 and [5], WO2005/102947 A1, which do not relate to the production of preforms from which laser active fibers can be drawn.

A method for the production of a preform blank for optical fibres, which has a core and an outer jacket of fused silica or doped fused silica is disclosed in [6], GB 2176472. The method disclosed in [6] incorporates the steps of inserting at least one porous or loose material element into a fused silica tube. Hence, this method requires the production of porous or loose material elements, e.g. according to the "OVD" principle, as mentioned above and described in [6].

According to [7], U.S. Pat. No. 5,572,618, great care is taken to minimize light losses in fibers due to absorption and scattering along the length of the filament, so that light applied to one end of the optical filamentary material is efficiently transmitted to the opposite end of the material. For this reason, low attenuation optical waveguides are commonly formed from fibers doped with rare earth elements. There are many situations, however, in which it is necessary to utilize optical attenuator devices to reduce the amount of power present in the optical signal. For this purpose in [7] a passive optical attenuating device is disclosed, which comprises an optical waveguide adapted to receive optical radiation and absorb, along its length, at least 0.2 dB/m of the optical radiation. The waveguide section may be coupled to a low-loss optical fiber so as to receive an optical signal to be attenuated therefrom. At least one region of the waveguide is doped with a transition metal to achieve a pre-selected absorptivity per unit length so that a controlled degree of attenuation can be achieved. In a fused silica fiber, an absorbing region is doped with ions of a metal selected from the class consisting of Fe, Ni, Co, Cr, Cu, Mn, Ti, and V, in a concentration effective to provide a predetermined degree of absorption at least one given wavelength. Signals of lower wavelengths could be attenuated for example at a ring layer.

These common methods are not easily manageable and require considerable efforts. As described above the dopants, RE-materials or metals such as transient metals must be brought to a zone which is suitable for performing the required reactions.

For said dopants the term A/A dopants, meaning Amplification/Attenuation dopants, is used below. The term "active fiber" is used below for any fiber that is doped with A/A dopants for amplification or attenuation purposes. If in the context it is of relevance that the fiber is used for amplification purposes, the term "laser active fiber" is used in its broadest meaning.

Hence, besides high efforts for executing the described processes, significant restrictions result in view of the placement of the A/A-dopants. While the geometry of the fibers can be designed as required, severe restrictions result for the location of the RE-dopants. These restrictions are especially disadvantageous in view of the considerations relating to obtaining maximum gain and minimum noise with laser active optical fibers. Ideally, the concentration of RE-dopants should be that high that a maximum number of stimulated emissions and a minimum of spontaneous emissions is achieved.

Further, with the above described vapour deposition processes it is difficult to obtain larger preforms that are suitably doped with A/A-materials. It is particularly difficult to obtain optical fibers with multiple cores that are suitably doped with A/A-materials.

A method for producing active fibers is disclosed in [8], WO 98/58884. According to this method RE-doped cutlets having a particle diameter between about 100 µm-5,000 µm are provided within a cladding structure. As stated in [8], the gain provided by a rare earth doped host medium can be increased by increasing the concentration of the suitable rare earth dopant. However, above a modest concentration, rare earth ion clustering and quenching become a problem.

It has been discovered that with known methods, desirable concentrations of rare earth dopants, i.e. desirable gains in optical media can still not be reached due to the described clustering problem. Hence, the concentration of RE-dopants and consequently the gain of the rare earth doped host medium remains restricted.

Further it has been found that clustering problems also occur when doping a host medium with attenuation dopants.

Still further, a problem which so far did not find appropriate attention relates to a lack of homogeneity of the refractive indices of core and cladding material. Inhomogeneities of the indices provided in the materials, which practically are not avoidable in deposition processes, may cause poor beam quality, particularly beam propagation deficiencies.

It would therefore be desirable to provide an improved method for fabricating A/A doped optical host media with large volumes, such as primary, secondary or higher order preforms and active optical fibers derived therefrom.

It would be desirable in particular to provide an improved method for fabricating A/A doped optical host media that allows achieving high concentration and high homogeneity of A/A dopants implanted in the derived host media, thus providing a high gain while avoiding clustering problems.

It would further be desirable to provide a method for fabricating A/A doped optical host media with improved homogeneity of the refractive indices and thus improved beam quality in the produced active optical fibers.

It would further be desirable to provide a method that allows fabricating high performance active optical fibers with multiple cores as well as high performance active photonic crystal fibers (PCF) with reduced effort.

It would further be desirable to provide a method that allows fabricating preforms from which active optical fibers can be drawn that allow induction of laser activity in a simple manner and with high efficiency.

It would also be desirable to provide an optical amplifier that operates with the inventive active optical fibers, particularly PCF-fibers, to provide a desired gain with a factor higher or lower than 1 (amplification or attenuation). It would be desirable in particular to provide an optical amplifier that allows pumping of the inventive, conventional or PCF, active optical fiber without the requirement of altering the signal path or mechanically touching the core of the active optical fiber, which is guiding the signal.

SUMMARY OF THE INVENTION

In a first embodiment of the invention a first preform is fabricated with a method that comprises the steps of:
- providing in an initial process stage a silica tube and an $SiO_2$-A/A mixture comprising $SiO_2$-particles and A/A- (amplification/attenuation) particles;
- holding the silica tube, that comprises an interior space that is limited at the lower end of the silica tube by a closure;
- pouring the $SiO_2$-A/A mixture into the interior space of the silica tube;
- preferably attaching an adjoiner to the upper end of the silica tube and generating a reduced pressure within the interior space; and
- heating at least the bottom portion of the unprocessed preform in order to fuse the silica tube and the $SiO_2$-A/A mixture.

The refractive indices of the material of the silica tube and the $SiO_2$-particles are selected depending on the sort of preform targeted. In the event that a primary preform shall be produced the refractive indices of the materials are identical and correspond to the core of an optical fiber. In the event that a primary preform shall be produced the refractive indices differ and correspond to core and cladding. In order to obtain a desired refractive index, dopants such as $GeO_2$, $P_2O_5$, $Al_2O_3$, and/or $B_2O_3$ are added to the silica grain.

In order to enhance solubility of the A/A-particles, a solubility aid such as such as Aluminum oxide $Al_2O_3$, Aluminum chloride $AlCl_3$, Germanium Ge or Phosphorus P are added to the liquid.

An improved homogeneity of the refractive index within regions of a preform or fiber originating from said mixture can be achieved if $SiO_2$-particles, A/A-particles and preferably solubility aid-particles are selected that have at least approximately the same size, e.g. in the range of 5-10 µm. So far, different particle sizes were offered by the suppliers of the various materials and processed by the producers of optical media. Hence, for the inventive method the purchased materials should not only chemically and physically but also geometrically be adapted to one another.

In a preferred embodiment in the initial process stage the $SiO_2$-A/A mixture is produced with a method that comprises the steps of:
a) providing $SiO_2$-particles in form of a soot, preferably with a grain diameter in the range between 10 nm and 1 µm;
b) providing A/A particles, preferably with a particle diameter in the range between 10 nm and 1 µm, such as chloride compounds (RE—$Cl_3$);
c) preferably providing solubility aid-particles (56) such as chloride compounds (Al—$Cl_3$);
d) providing a liquid such as water, methanol, ethanol or alcohol;
e) mixing the $SiO_2$-soot, the A/A particles, preferably the solubility aid-particles (56) and the liquid in order to obtain a slurry;
f) drying the slurry, e.g. in a furnace or oven, preferably at a temperature in the range of 80° C.-120° C.; and
g) applying a mechanical impact to the dried slurry in order to obtain a pulverised $SiO_2$-A/A mixture, which is then poured into the interior space of the silica tube.

The $SiO_2$-soot can be added to the liquid, followed by the A/A particles. Alternatively and preferred, the A/A particles are added to the liquid first, which then is mixed with the $SiO_2$-soot in order to obtain the slurry.

With this method, clustering of A/A-particles can be avoided even if provided in comparably high concentrations. The A/A-particles are homogenously distributed within the $SiO_2$-A/A-mixture and later on in the A/A doped host medium, i.e. in the core and/or cladding parts of the preform or fiber. Hence A/A doped host media with significantly higher gain or attenuation can be fabricated. While providing excellent results the new method can be performed with little effort. At the same time the refractive index is also homogeneously distributed across the processed material.

Fibers derived from inventive optical media comprise therefore significantly improved properties, particularly in view of gain and beam quality of applied signals.

Further, it is possible to apply different sorts of A/A-particles in high concentrations and obtain various desired properties e.g. selective signal amplification and/or attenuation in different ranges of the wavelength spectrum.

The $SiO_2$-A/A mixture preferably contains 80%-98% atomic weight, preferably 84%, $SiO_2$-particles; 0.1%-10% atomic weight, preferably 2%, A/A-particles; and 0.7%-70% atomic weight, aluminum-particles.

The $SiO_2$-A/A mixture preferably contains up to seven times more aluminum particles, than A/A-particles.

The liquid preferably contains per liter
50-150 grams, preferably 100 grams of $SiO_2$-soot;
0.025-0.1, preferably 0.05 moles of A/A-chloride; and
0.075-0.5, preferably 0.2 moles of Al-chloride.

It is important to note that the inventive $SiO_2$-A/A mixture can be used for any part of any optical media such as primary and higher order preforms, including tubes provided for manufacturing preforms, and optical fibers derived therefrom. Hence, any part of a preform or fiber can be fabricated, from said $SiO_2$-A/A mixture. In the event that material is desired with an optimal homogeneity of the refractive index, but without laser activity, then the A/A-particles are simply reduced or omitted in the above formula.

In a preferred embodiment the $SiO_2$-A/A mixture is post-processed with the steps of:

g) applying at the lower end of the silica tube a closure that consists of porous material such as porous glass;
h) pouring the prepared $SiO_2$-A/A mixture into the interior space of the silica tube;
i) introducing a flow of gas such as oxygen $O_2$, helium He, chloride Cl2 or fluorine F through the first closure and through the $SiO_2$-A/A mixture contained in the silica tube and heating the silica tube in order to purify and calcinate the $SiO_2$-A/A mixture with a temperature below the vitrification level (preferably approx. 1200° C.); and
j) heating with a temperature above the vitrification level (preferably 2100° C.) at least the bottom portion of the unprocessed preform in order to fuse the silica tube and the $SiO_2$-A/A mixture.

The silica tube and the $SiO_2$-A/A mixture can be heated completely over the entire length in order to obtain processed preform. Alternatively the molten elements can simultaneously be transformed while heating a limited portion, e.g. by drawing a fiber or drawing at least one elongated preform. Hence, from the silica tube and the $SiO_2$-A/A mixture one only or a plurality of preforms can be obtained.

In a subsequent process step, one or more of the fabricated preforms can be integrated in a secondary preform, from which, due to the A/A-particles provided in the silica tube and/or the $SiO_2$-A/A mixture of the fabricated preforms, an active optical fiber can be drawn.

In a preferred embodiment, for the production of laser active optical fibers that can be pumped with a high efficiency, longitudinal holes are provided in the preform. Said holes are preferably produced by inserting removable rods, such as rectangular or cylindrical rods, into the silica tube before the $SiO_2$ grain is inserted.

In one embodiment, at least one longitudinal hole with a preferably flat plane is provided in the cladding region of the preform with the plane oriented towards the core region of the preform. Hence, pump signals that reach said plane are reflected towards the core region of the optical fiber. Further, the peripheral material surrounding the plane can easily be removed leaving an approximately D-shaped profile.

Alternatively, an even higher efficiency of laser pumping can be achieved if the preform is provided with numerous holes provided in the cladding region of the preform. Preferably at least 3, preferably 5 holes are provided that a) are randomly distributed preferably in the peripheral zone of the cladding region of the preform;
b) comprise a hole-diameter of preferably 1/10 of the diameter of the preform; and
c) are spaced apart at least by one hole-diameter.

Further, a silica tube can advantageously be used that has been doped with A/A-material, which will evenly be distributed in the peripheral region of the preform, yielding significant advantages. The primary silica tube, or a secondary silica tube as mentioned below, can easily be produced with a desirable doping of A/A-particles that are evenly distributed within the tube material. For example, A/A-material in form of dry powder can be mixed with silica that is in a molten state. More preferably, an $SiO_2$-A/A-mixture can be prepared as described above. Since the RE-material is evenly distributed in the peripheral region of the core of the laser active optical fiber, which has been drawn from such a preform, it can be reached from the cladding with applied pump signals with high intensity. Hence the inventive laser active optical fibers allow the introduction of pump signals through the core or through the cladding. Introducing pump signals through the cladding, for example through neighbouring auxiliary tubes, e.g. multimode-fibers, or transfer sleeves as described below, yields the advantage that the core remains untouched; cutting the core apart and splicing is not required.

Optionally a process of grinding the surface of the fabricated preform may be executed in order to at least partially remove the material of the silica tube, thus leaving a primary preform or a preform blank that consists of the molten $SiO_2$-A/A mixture that had been doped with A/A-material.

In a further embodiment an A/A-doped silica tube is filled tightly matching with a solid glass blank or an inventive preform instead of the $SiO_2$-A/A mixture. This combination of the A/A-doped primary silica sleeve tube and the inserted solid silica blank or the inventive preform results in an unprocessed primary preform. The result in view of physical properties and the related advantages is comparable to the one of the first embodiment. The A/A-dopants of the silica tube will again evenly be distributed in the peripheral zone of the core of the resulting fiber. Attenuation, for example, can be performed at different wavelengths.

A further embodiment of the invention, in which the inventive principles of the first and the second embodiment are applied, relates to the manufacturing of a preform for active photonic crystal fibers, particularly laser active optical fibers. In this third embodiment, an A/A-doped silica tube, preferably produced with the inventive $SiO_2$-A/A mixture, is applied in the preform in a position, which relates to the core region of the active photonic crystal fiber. Since photonic crystal fibers use hollow cores, the preferably thin walled A/A-doped silica tube is not filled with a silica blank or silica grain, but preferably with a removable rod. Hence, the optical signal is confined within the hollow core by means of the photonic bandgap effect and amplified when meeting the surface of the A/A-doped silica tube.

In all three embodiments laser activity or attenuation of a fiber drawn from the preform is advantageously achieved. In the first and second embodiment A/A-material can be confined in the central portion of the core, where the intensities of the pump signal, if not applied through the cladding, and the user signal are generally highest. In this case the primary silica grain is doped with A/A-material, e.g. with erbium in a typical concentration of 50 ppm or above. However, if the pump signal is introduced trough the cladding, then the primary silica tube, which relates to the peripheral region of the core, is doped with A/A-material preferably up to the clustering limit.

Introduction of pump signals into the cladding can be made after the removal of the coating, e.g. by means of an optically conducting sleeve, or by means of pump fibers that are provided within the cladding. The transfer of the pump signals from the cladding to the core is performed with minimal losses, if the material of core and cladding comprise the same refractive index. Hence, the pump signal is not reflected in the core region and can reach with relatively high intensity the core, particularly the peripheral zone. In order to confine the user signal, in spite of the identical or similar refractive indices of the core material and cladding material, within the core the cladding is provided with structural elements that are filled with air. These structural elements are designed in such a way that in average a refractive index for the cladding that is lower than the refractive index of the core. Hence this further embodiment of the active optical fiber and the preform it is originating from is ideal for pumping through the cladding. Said structural elements can be achieved for example by providing auxiliary silica tubes in the secondary preform that are filled with air or a suitably selected gas.

In order to obtain laser activity in the inventive photonic crystal fibers, the structure, e.g. the periodicity e.g. of a honeycomb structure, could, either locally or over the whole fiber and consequently over the whole preform, be disturbed with the consequence that the signal enters the peripheral zones of the core region which consist of material originating from the A/A-doped silica tube.

Optimized structuring and optimized doping of the fibers and the corresponding preforms can be performed most advantageously with the process steps explained below that are based on the idea using silica grain or for fabricating secondary or higher order preforms.

The primary preform of the first embodiment, the unprocessed preform of the second embodiment and the A/A-doped silica tube of the third embodiment, which have an outer surface, are inserted into a secondary silica tube having an inner surface.

If required,
a) for the adjustment of the refractive index of the cladding, as described above,
b) for providing fibers for pumping purposes, as described above,
c) for achieving the photonic bandgap effect,
d) for realising multiple core fibers,
additional structural elements such as auxiliary silica tubes, removable auxiliary rods, silica blanks or processed primary preforms which also have outer surfaces.

The outer surfaces of the inserted element and the inner surface of the secondary silica tube define a second interior space limited at a first end of the secondary silica tube by a second closure.

In a further process step the inserted elements are held in a substantially longitudinally coaxial relationship with the secondary silica tube. Then, secondary silica grain is inserted into the second interior space.

Afterwards the second interior space is limited at the upper second end of the secondary silica tube by a second adjoiner and then a reduced pressure is generated within the second interior space and the secondary silica tube, the secondary silica grain and the inserted structural elements are heated completely over the entire length or partially while simultaneously drawing an optical fiber.

BRIEF DESCRIPTION OF THE DRAWINGS

Some of the objects and advantages of the present invention have been stated, others will appear when the following description is considered together with the accompanying drawings, in which:

FIG. 1 and 1a shows a thin-walled primary silica ($SiO_2$) tube 11 with an axis x, an interior space 12 and a closure 13 at its lower end;

FIGS. 2 and 2a shows the primary silica tube 11, 11d from FIG. 1 with an adjoiner 3 at its upper side, through which primary silica grain 51 or an $SiO_2$-A/A mixture 58 is filled into the interior space 12 in order to create an unprocessed primary preform 1;

FIGS. 3 and 3a shows the process of heating, melting and fusing the primary silica grain 51 or $SiO_2$-A/A mixture 58 and the primary silica tube 11, 11d in order to obtain a processed primary preform 1;

FIG. 4a-4f show the treatment of the heat processed primary silica preform 1 of FIG. 3, during which a peripheral layer is removed, which consists of material originating from the primary silica tube 11;

FIG. 5a-5c show the assembly of a secondary preform 10 with a thin-walled secondary silica ($SiO_2$) tube 111 that receives, co-axially aligned, the A/A-doped primary preform 1, 1' of FIG. 4 and secondary silica grain 510 or an $SiO_2$-A/A-mixture 58;

FIG. 6 shows the upper end of secondary preform 10 from FIG. 5, which further comprises a thin walled A/A-doped sleeve tube 11d, e.g. a primary silica tube as shown in FIG. 1, that is tightly enclosing the silica blank 15;

FIG. 7 shows the upper end of secondary preform 100 that comprises five primary or secondary preforms 1, 10 as shown in FIG. 4 or FIG. 6 and auxiliary tubes 11x contained in a secondary silica tube 111;

FIG. 9 shows an apparatus 2 used for drawing an optical fiber 8 from the secondary preform 10, 10' of FIG. 5 or FIG. 6;

FIG. 10 shows the apparatus 2 of FIG. 9 used for drawing an optical fiber from the secondary preform 100, 100' of FIG. 7 or FIG. 8;

FIG. 13 shows an optical amplifier that uses a few windings of an inventive active optical fiber 8;

FIG. 14, 14a shows an optical amplifier 600 that applies pump signals through the cladding of an inventive active optical fiber 8;

FIG. 15a-15h show the inventive method for fabricating preforms and fibers in the most advantageous embodiment; and FIG. 16a-16c show fibers 8, that are provided with hollow or massive structural elements 822, 822' that allow laser pumping through the cladding with high efficiency; and FIG. 17a-17e shows the assembly of preforms designed for producing optical fibers according to FIG. 16a-16c.

DETAILED DESCRIPTION OF THE PREFERRED EMBODIMENTS

Figure 8:
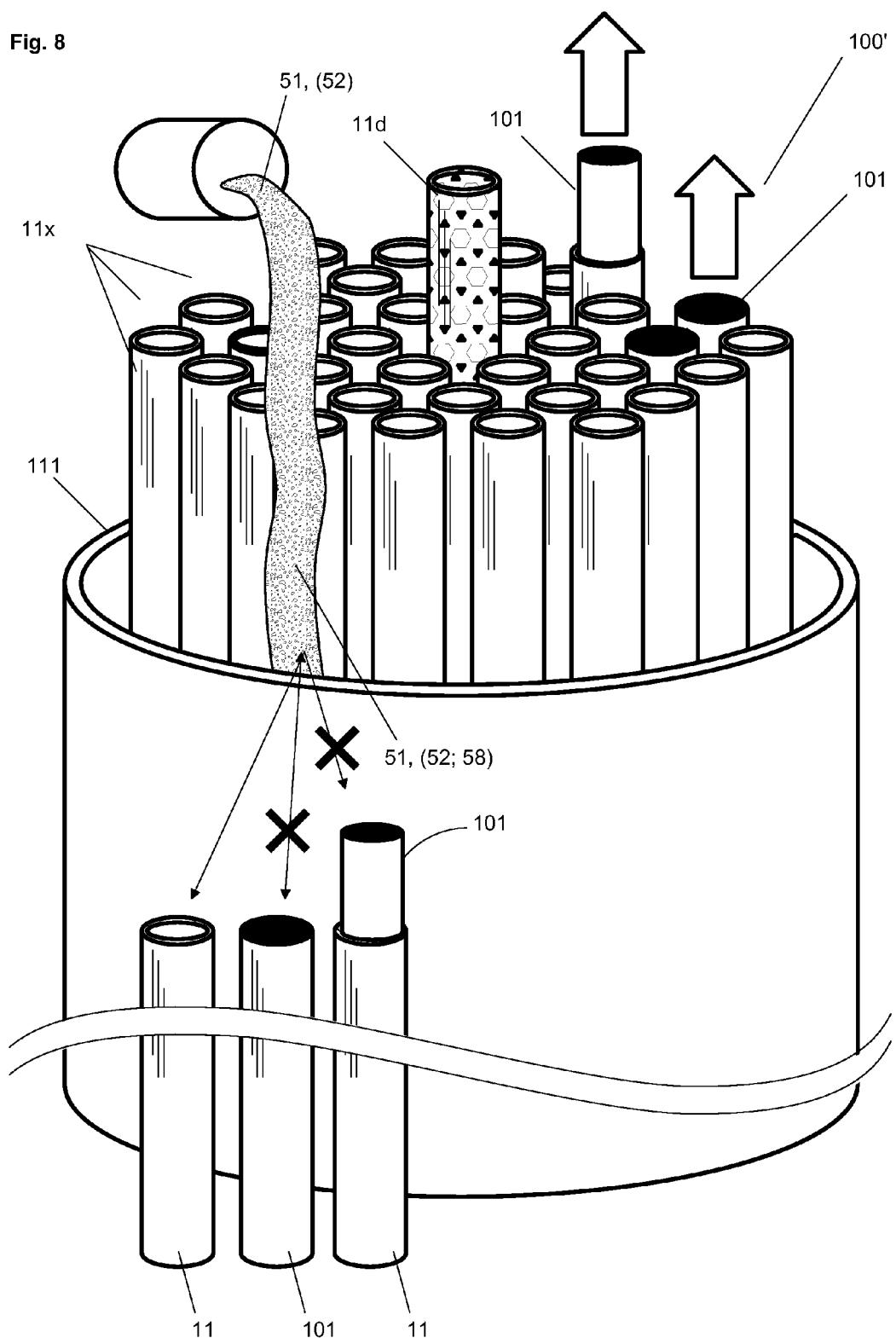
FIG. 8 shows a secondary preform 100' intended for producing photonic crystal fibers, with an A/A-doped silica tube 11d, auxiliary tubes 11x and auxiliary rods 101 arranged in a two-dimensional periodic structure.

FIG. 1 shows a primary silica ($SiO_2$) tube 11 having a longitudinal axis x, an outer diameter d1, a wall diameter d10, an interior space 12 and a closure 13 at its lower end, which is preferably made as one piece together with the primary silica tube 11. Optionally, as shown in FIG. 2, e.g. magnified sections B and C, the primary silica tube 11 may contain, enclosed in its walls, A/A-material 52 of one or numerous sorts, for purposes that are described below.

FIG. 2 shows the silica tube 11, 11d of FIG. 1 with an adjoiner 3 at its upper side comprising a first channel 31, through which primary silica grain 51 or an $SiO_2$-A/A mixture 58, which will be described below with reference to FIG. 15 is filled into the interior space 12 of the silica tube 11. FIG. 2 further shows different options A, B and C of using a silica tube 1d and primary silica grain 51 that are differently doped with A/A-material 52, thus resulting in different localisations of different selectable A/A-materials 52 within the processed primary preform 1 and consequently in the core of the optical fiber drawn therefrom.

A/A-material can be RE-material such as Neodymium, Europium, Dysprosium, Holmium, Erbium, Thulium, or Ytterbium or metal, such as Fe, Ni, Co, Cr, Cu, Mn, Ti, and V. For the dopants applied according to the present invention, a single sort of material, for laser active fibers typically erbium, can be selected. However, depending on the wavelengths of the guided signals, also two ore more sorts of A/A-material can be applied.

Magnified section A shows the silica tube 11 free from A/A-dopants. Instead several sorts of A/A-dopants 52 are contained in the primary silica grain 51. In the upper half of section A, different particles of a mixture of A/A-materials are mixed with the silica grain particles. As shown in the lower half of section A, the A/A-materials are preferably confined within the silica grain. This can be achieved by adding the A/A-material to silica ($SiO_2$) that is in molten state, which then is stirred until the A/A-material is evenly distributed within the processed $SiO_2$-A/A mixture. The grain derived from the doped liquid then contains and maintains an even distribution of the A/A-material.

However, most preferably the process of preparing the $SiO_2$-A/A mixture is performed according the following steps:

a) providing $SiO_2$-particles 51 in form of a soot, preferably with a grain diameter in the range between 10 nm and 1 µm;
b) providing A/A particles 52, preferably with a particle diameter in the range between 10 nm and 1 µm, such as chloride compounds (RE—$Cl_3$);
c) providing a liquid 55 such as water, methanol, ethanol or alcohol;
d) mixing the $SiO_2$-soot 51, the A/A particles 52 and the liquid 55 in order to obtain a slurry.

Figure 15A:
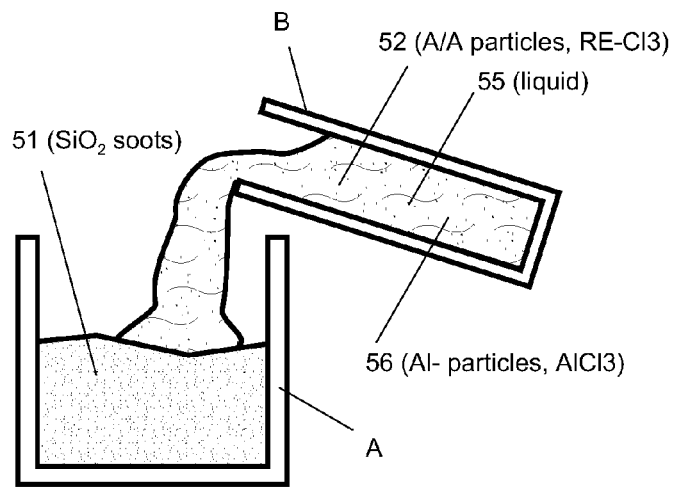

For this preferred procedure it is important that a liquid 55 is used, which can be mixed with the $SiO_2$-soot 51 and the A/A particles 52 in different ways. The $SiO_2$-soot 51 can be added to the liquid 55 or vice versa. Then the A/A particles 52, preferably RE-chloride RE—$Cl_3$, are added in order to obtain the slurry. Alternatively and preferred, the A/A particles 52 and preferably solubility aid particles 56, such as compounds having the generic formula $Al_xCl_x$ compounds, are added to the liquid 55, which then is poured into a container A, which contains the $SiO_2$-soot 51, as illustrated in FIG. 15a.

Figure 15B:
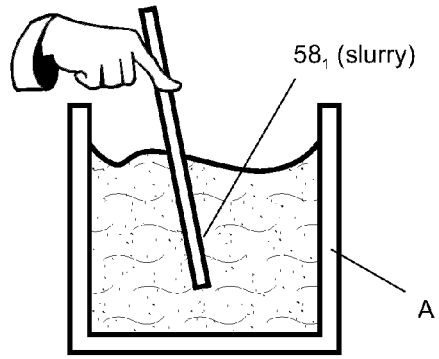

In order to obtain an even distribution of the liquid 55 the resulting slurry $58_1$ is preferably stirred, as illustrated in FIG. 15b.

Figure 15C:
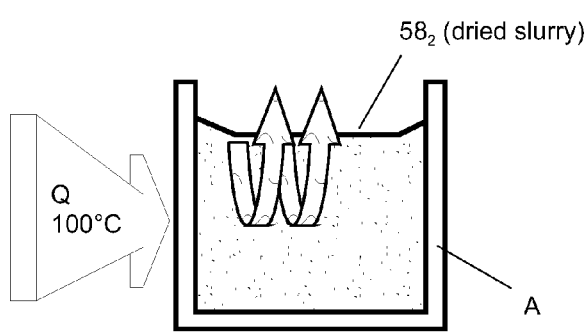

Then the slurry $58_1$ is dried, preferably in an oven under a temperature in the range of 100° C., as illustrated in FIG. 15c.

Figure 15D:
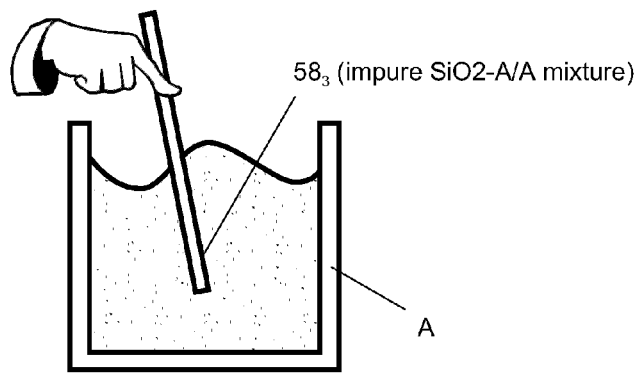

As shown in FIG. 15d the dried slurry 582 is then pulverised under the impact of mechanical energy in order to obtain a powder or soot $58_3$, in which the A/A particles 52 are homogeneously distributed.

In the further process step shown in FIG. 15e the pulverised $SiO_2$-A/A mixture $58_3$ is then poured into the interior space 12 of a silica tube 11, which has been provided with a gas permeable closure 13 at its lower end. The permeable closure 13 preferably consists of porous glass, which allows transfer of a gas but holds the introduced $SiO_2$-A/A mixture in place.

In the next process step illustrated in FIG. 15f a flow of gas, such as Oxygen $O_2$, Helium He or Fluorine F, is introduced through the gas permeable closure 13 and through the $SiO_2$-A/A mixture 58 contained in the silica tube 11, that is heated with a temperature below the vitrification level, e.g. at 1200° C. With this process step the $SiO_2$-A/A mixture 58 is purified and calcinated. Organic compounds, particularly dissolved chlorides originating from RE—$Cl_3$-compounds are removed with the gas flow which leaves the silica tube 11 at its upper end.

In the final process stage illustrated in FIG. 15g or alternatively in FIG. 15h at least the bottom portion of the resulting unprocessed preform 1 is heated in a furnace 23 at a temperature above the vitrification level, preferably around 2100° C. in order to fuse the silica tube 11 and the $SiO_2$-A/A mixture 58. In FIG. 15g the unprocessed preform 1 is heated over its entire length in order to obtain a processed preform that can be used at another time and place, e.g. for producing a more complex preform as described below. In FIG. 15h the unprocessed preform 1 is heated partially at its lower end from which an optical fiber 8 is simultaneously drawn.

The inventively produced $SiO_2$-A/A mixture can advantageously be used in all options in all applications described above or hereafter.

Magnified section B of FIG. 2 shows that both, the primary silica tube 11d and the primary silica grain 51, are doped with different A/A-materials $52_1$, $52_2$. Magnified section C of FIG. 2 shows that only the primary silica tube 11d is doped with the different A/A-materials $52_1$, $52_2$.

The diameter d10 of the circular wall of the (thin walled) primary silica tube 11, 11d is for example ten times smaller than its outer diameter d1. However the ratio of said diameters d1/d10 may be up to 50 and higher. Hence, the volume of the interior space 12 is relatively large, i.e. several times larger than the volume of a conventional preform.

After the primary silica tube 11, 11d has been filled completely the insertion channel 31 of the adjoiner 3 is closed by a sealing cap 39. Then a vacuum pump 22, that is connected to an evacuation channel 32 provided in the adjoiner 3, removes the air out of the interior space of the primary silica tube 11, 11d, in order to avoid air inclusions in the processed preform 1.

FIG. 3 shows the process of heating, melting and fusing the primary silica grain 51; 51, 52 and the primary silica tube 11, 11d in order to obtain a processed primary preform 1. The partially processed primary preform 1 is vertically aligned and mounted in a holding device 21 that allows controlled vertical movement and preferably rotation of the primary preform 1 along and around its axis x. Preferably, the holding device 21 is designed to apply a vibration onto the primary preform 1 in order to condense the primary silica grain 51 provided in the interior space 12 of the primary silica tube 11, 11d.

FIG. 3 further shows a heat supply or furnace 23, which allows heating of the primary preform 1 for example to temperatures in the range of to 2100° C. to 2350° C. Due to the thermal energy provided by the furnace 23 and due to the established difference of pressures that are present in and outside the preform 1, the primary silica tube 11, 11d and the primary silica grain 51, 52 will melt and fuse together. After the completion of the heating process the primary silica 11, 11d and the primary silica grain 51, 52 will form a practically homogeneous silica body, which however comprises different zones individually doped with A/A-material(s).

Instead of heating the primary silica tube 11, 11d and the primary silica grain 51, 52 completely over the entire length, the molten elements can simultaneously be transformed while heating a limited portion, e.g. by drawing a fiber or drawing at least one elongated primary preform 1. Hence, from the primary silica tube 11, 11d and the primary silica grain 51, 52 only one or a plurality of preforms 1 can be obtained that are tailored to the specific requirements. E.g. an element drawn from the primary silica tube 11, 11d and the primary silica grain 51, 52 could be used as a fiber or a fiber cavity in a laser system or as a primary preform 1 that is introduced into an unprocessed secondary preform as described below.

FIG. 4a-4f show the treatment of the heat processed primary preform 1 of FIG. 3, during which a peripheral layer is removed, which consists of material derived from the primary silica tube 11. FIGS. 4a and 4b show the processed primary preform 1 of FIG. 3 after the terminated heating process. FIGS. 4c and 4d show the processed primary preform 1 during the grinding process, preferably executed by an automated grinding tool. FIGS. 4c and 4d show the processed primary preform 1 after the completion of the grinding process, which is recommended to be performed in the event, that the material of the primary silica tube 11 does not favourably contribute to the properties of primary preform 1 or the optical fibers derived therefrom.

FIGS. 5a and 5b show the assembly of a secondary preform 10 with a thin-walled secondary silica (SiO₂) tube 111 that receives, co-axially aligned, the A/A-doped primary preform 1, 1' of FIG. 4 (see FIG. 5a) and secondary silica grain 510 (see FIG. 5b).

FIG. 5c shows the assembly of a secondary preform 10' with a thin-walled secondary silica (SiO₂) tube 111 that receives, co-axially aligned, an un-doped silica blank 15 and secondary silica grain 510.

The magnified sections D1, D1, D2, D2' and E, E1, E1', E2, E2' show that the secondary silica tube 111 and/or the secondary silica grain 510 can be doped with A/A-material(s) as already described for the primary silica tube 11, 11' and the primary grain 51 in order to obtain the desired properties of the secondary preform 10, 10'.

FIG. 6 shows the upper end of secondary preform 10 from FIG. 5c, which further comprises a thin walled A/A-doped sleeve tube 11d, e.g. a primary silica tube as shown in FIG. 1, that is tightly enclosing the silica blank 15. This embodiment of the invention allows bringing A/A-doped material contained in the sleeve tube 11d into the peripheral zone of the silica blank 15. Preferably the silica blank 15 and the sleeve tube 11d comprise the same refractive index so that a homogeneous silica core can be produced that however comprises zones that are differently doped with A/A-materials 52. Still further it is possible to use the same refractive index for the silica blank 15, the secondary sleeve tube 11d and the secondary silica grain 510. In this event the refractive index of the cladding which primarily consists of the molten secondary silica grain 510 can be adjusted by introducing longitudinal air gaps. As schematically shown in FIG. 6, auxiliary tubes 11x could be provided between the silica blank 15 and the wall auf the secondary silica tube 111 in such a size and number that in average a desired refractive index results from the air or gas enclosed in the auxiliary tubes 11x and the molten secondary silica grain 510. Hence in an optical fiber 8 drawn from this secondary preform 10 (see FIG. 10), the optical signal will travel not only in the center of the core, but also in material of the peripheral regions of the core which are derived from the A/A-doped silica sleeve tube. Since no index step occurs along the radius of the secondary light can pass with reduced losses from the surface of the cladding or from a fiber within the cladding to the center of the core. However the light can most easily reach the peripheral zone of the core.

FIG. 6 further shows a second adjoiner 30 for the secondary preform 10, which comprises a channel 310 that receives the silica blank 15 (or a primary preform 1, 1'). The secondary silica grain 510 can be introduced for example through the evacuation channel 320, which, after the filling of the secondary silica grain 510 has been completed, is connected via a fitting 221 and a tube 220 to the vacuum pump 22. In order to completely close the unprocessed secondary preform 10 a sealing cap 390 is mounted on top of the adjoiner 30.

FIG. 7 shows the upper end of the secondary preform 100 that comprises a larger secondary silica tube 111, in which five primary preforms 1, as shown in FIG. 4, or five secondary preforms 10, as shown in FIG. 6, auxiliary tubes 11x and auxiliary silica rods 15 (or silica blanks) are contained. In addition, secondary silica grain 510 is inserted into the secondary silica tube 111. Again, the secondary silica grain 510 and the secondary silica tube 111 can be doped with A/A-material as required. From this secondary preform 100, after it has further been processed, an optical fiber can be drawn that comprises multiple active cores. Elements of the drawn fiber that relate to the auxiliary tubes 11x or to the auxiliary rods 15 can be used for injecting and guiding pump signals as detailed below.

FIG. 8 shows the upper end of the secondary preform 100' that comprises a larger secondary silica tube 111, in which an A/A-doped silica tube 11d, auxiliary tubes 11x and removable auxiliary rods 101 are arranged in a two-dimensional periodic structure. From this secondary preform 100', after it has further been processed, a photonic crystal fiber (PCF) can be drawn. The two-dimensional periodic structure is selected to apply the photonic band gap (PBG) effect in the Photonic Crystal Fibre drawn from the processed secondary preform 10.

The removable auxiliary rods 101 serve as space holders within the grain 510 or within an auxiliary tube 11x or within the A/A-doped silica tube 11d. As a consequence, if removable auxiliary rods 101 are applied, relatively thin walled silica tubes, preferably of a standard size, can be selected, that will not be deformed or collapse during the heating process. The removable rods 101, which are removed after completion of the heating process, keep the interior of the silica tubes 11x, 11d in correct shape. Further, a removable rod 101 can be used without an auxiliary tube 11x to maintain a free elongated space within the silica grain. After the preform 100' has been processed the removable rod 1205 is removed. Auxiliary rods 101 can easily be removed from vitrified silica, if a material, such as graphite, with a thermal expansion coefficient is used, which is larger than the thermal expansion coefficient of glass. During a cooling process, such a rod 101 will retract or shrink stronger than glass so that will no adhesion remain to the glass. Hence, with removable rods, preforms with complex structures comprising numerous elongated void elements can easily be created.

FIG. 9 shows an apparatus 2 used for drawing an inventive optical fiber 8 from the secondary preform 10, 10' of FIG. 5. Once the secondary preform 10, 10' is heated to its melting point and a fiber 8 has been pulled, an angular area called the neck-down is formed. A single optical fiber 8 emerges from the secondary preform 10, 10' in a semi-molten state and passes through a diameter monitor 24. The optical fiber 8 continues to be pulled downward and passes through a coating applicator 25 that applies a coating to protect the optical fiber 8. The optical fiber 8 also passes through other units 26, 27 that cure the optical coating and monitor the overall diameter after the coating has been applied. The optical fiber 8 then encounters a spinning apparatus 28 which may comprise a roller that imparts a spin into the optical fiber 8. The optical fiber 8 then eventually encounters a series of rollers (not shown) pulling the optical fiber 8 before it is then wrapped around a drum or spool 29. The secondary preform 10, 10' is mounted in a holding device 21, which allows controlled vertical movement along and preferably rotation around its axis. Furthermore the holding device 21 may be designed to apply a vibration onto the secondary preform in order to condense the secondary silica grain 510.

FIG. 10 shows the apparatus 2 used for drawing an inventive optical fiber 8, such as a photonic crystal fiber, from the secondary preform 100, 100' of FIG. 7 or FIG. 8.

As described in [2], page 246 an optical signal that is guided in an optical fiber must be regenerated after certain distances. A repeater is placed some distance along a cable to prevent substantial signal attenuation occurring. A regenerator may also be used for reconstituting the shape of a digital signal and thereby prevent signal noise being amplified too. With a semiconductor laser source of around 1 mW power, the maximum distance before regeneration is necessary between 100 and 200 km. The transatlantic fiber optics cable, for example, that was laid in the 1970s has repeaters every 70 km.

Further according to [2], the general principle of optical amplification relies on stimulated emission, as in the laser. A population inversion must first be established between two states, and the stimulated emission boosts the number of in-phase photons. Fiber amplifier technology began in 1964 when neodymium was suggested as a suitable element for doping a fiber. A major advance was made in the mid 1980s when erbium was found to produce an optical gain of a few thousand at a wavelength of 1.5 µm; it integrates well with an InGaAsP light source. Praesodymium-doped fibers are currently being investigated since they operate around 1.3 µm, the other wavelength used in communication Systems.

[3], page 247, FIG. 9.20 shows the basic layout of an optical amplifier with the erbium-doped fiber spliced into the transmission fiber. Light from the laser source is combined with the signal via the wavelength-selective coupler. The laser light optically pumps the erbium atoms into excited states and the signal induces stimulated emission at the signal wavelength. Optical isolators (antireflection coatings) prevent unwanted reflections and the filter blocks the laser light.

Figure 11:
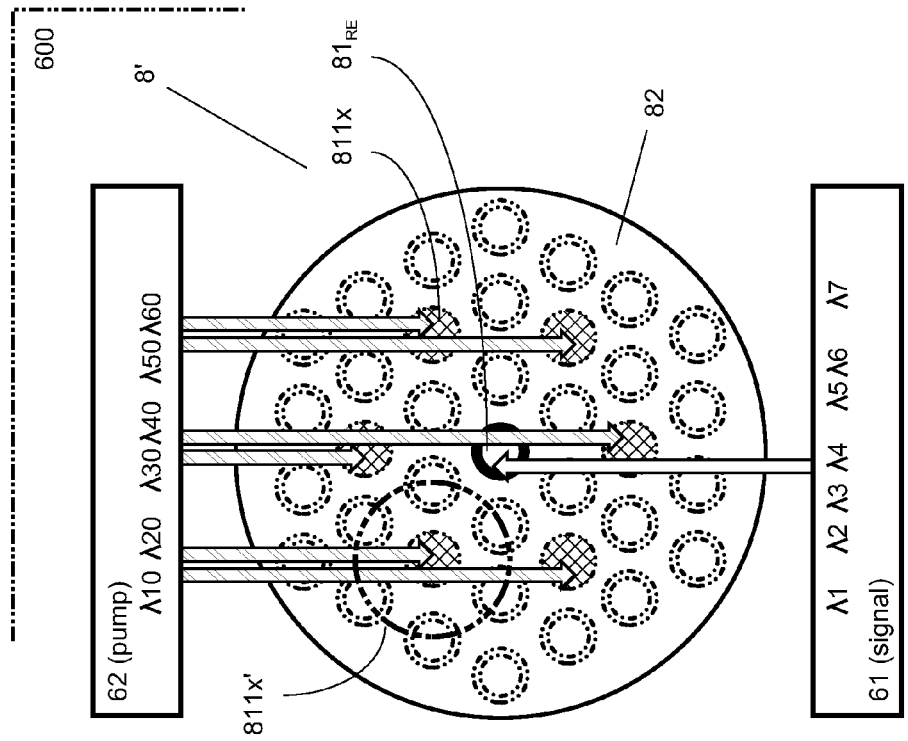
FIG. 11 shows an optical amplifier 600 with a sectional view of an inventive active optical fiber 8 that comprises multiple cores 811, 812, . . . and auxiliary fibers 811x.

FIG. 11 shows a simplified optical amplifier 600 and a sectional view of an inventive active optical fiber 8 that comprises multiple cores 811, 812, . . . and auxiliary fibers 811x that originate for example from silica rods or blanks that were provided in the secondary preform 10, 10'. FIG. 11 shows a source unit 62 that provides pump signals in several wavelengths $\lambda10, \ldots, \lambda60$. These pump signals $\lambda10, \ldots, \lambda60$ are injected in multi mode pump fibers 811x and travel then through the cladding to the cores 811, 812, where the RE-ions are exited. Hence, signals $\lambda1, \ldots, \lambda7$ that are travelling in the cores of the optical fiber 8 will cause stimulated emissions and thus get amplified.

Figure 12:
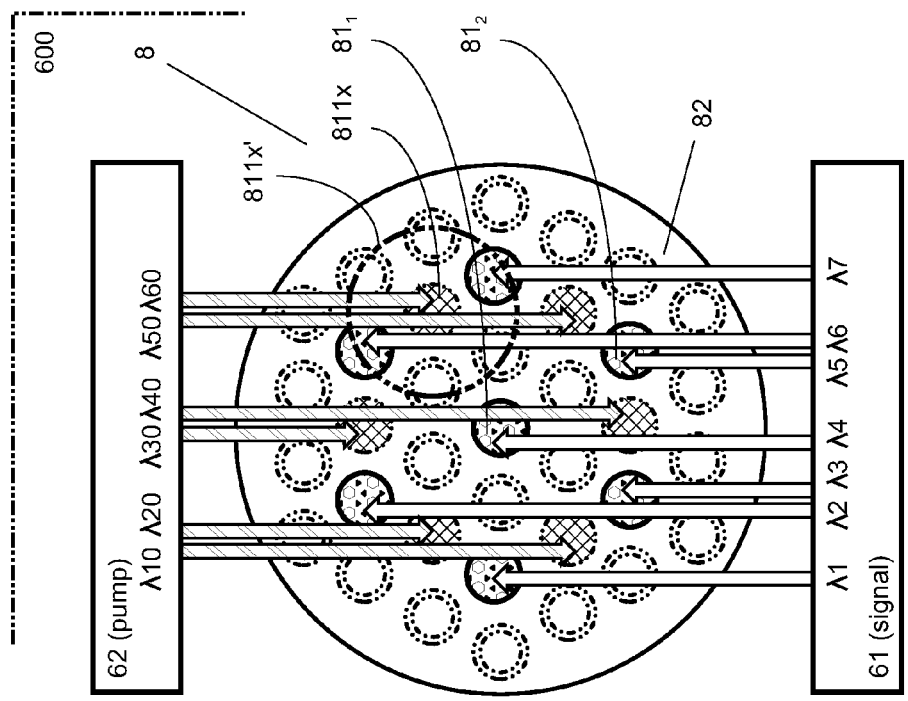
FIG. 12 shows an optical amplifier 600 with a sectional view of an inventive photonic crystal fiber 8'.

FIG. 12 shows an optical amplifier 600 and a sectional view of an inventive photonic crystal fiber 8'. Again pump signals $\lambda10, \ldots, \lambda60$ are provided to multi mode pump fibers 811x provided in the cladding. From the pump fibers the pump signals reach the peripheral zone of the core region 81RE which relates to the RE-doped silica glass tube 11d. If the periodic structure is slightly disturbed, then the guided user signal, at least the evanescent field will enter this doped peripheral zone and cause stimulated emissions and an amplification of the user signal.

As shown in FIGS. 11 and 12, a major advantage of the present invention is that the structure of the preforms and thus the structure of the active optical fibers can freely be selected. Hence, large pump fibers can easily be incorporated which can be identified and opened for the purpose of injection pump signals without interrupting core which guides the user signal. Alternatively it is even possible to inject light without using pump fibers. For this purpose the active optical fiber 8 is entered into a sleeve 85, which receives and transfers the pump signals (see FIG. 14a). As mentioned above, the pump signals are transferred with minimal losses if the materials used for the different elements comprise an identical refractive index and the refractive index of the cladding is elevated by means of inclusions of air or gas.

FIG. 13 shows the optical amplifier known form [3] that uses a few windings of an inventive active optical fiber 8 that is spliced (see splicing positions 65) to an optical transmission line 81. A weak signal is forwarded from an incoming end of an optical transmission line 81 via an optical isolator 64 and a laser filter 66 to the inventive active optical fiber 8. The laser filter 66 blocks pump signals that are generated by a laser source 62 and that are injected into the inventive active optical fiber 8 through a coupling element 63. Hence the weak user signal gets amplified in the inventive active optical fiber 8 and is forwarded to the outgoing end of the optical transmission line 81. In FIG. 13 it is shown that not only a single signal, but also a plurality of signals guided in multiple cores could be amplified.

FIG. 14 shows two optical amplifiers 601 which regenerate an optical signal that is guided in an inventive optical fiber, without disturbing the signal path by means of splicing. FIG. 14 shows the first option of using a pump fiber 811x that has been cut open for injecting a pump signal.

FIG. 14a shows a second option in which a sleeve tube 85 is receiving the optical fiber 8 from which the coating has been removed. Pump signals are then injected via the sleeve tube 85 into the optical fiber 8 for stimulating the RE-ions.

FIG. 16a-16c symbolically show active optical fibers 8, that are provided with least hollow structural element 822 or with a massive structural element 822' in the cladding region 82, which structural element 822, 822' is designed for supporting the transfer of pump signals with high efficiency through the cladding 82 to the core 81 of the optical fiber 8. An arrangement that allows transferring of pump signals through the cladding 82 to the core 81 of an optical fiber 8 is illustrated in FIG. 14.

The structural element 822, 822' consists of a hole or massive material that preferably differs from the remaining cladding material in view of the refractive index and/or an RE-dopant implanted.

FIGS. 16a and 16b closely relate to one another. Each of the optical fibers 8 comprises a core 81 and a cladding 82 provided with a flat plane.

On the cladding 82 of the optical fiber 8 shown in FIG. 16a a complete segment has been removed, e.g. cut away with a laser, leaving the flat plane 821 exposed.

The optical fiber 8 shown in FIG. 16b has been provided with a hollow or massive structural element 822; 822' comprising a rectangular profile. The side of the structural element 822; 822' which is facing the core 81 of the fiber 8 corresponds functionally to the flat plane 821 of the optical fiber 8 shown in FIG. 16a. However, providing a hollow or massive structural element 822; 822' in the cladding 82 is easier than applying a laser tool in order to cut out a desired fraction of the fiber 8. Further, complete removal of the peripheral region opposing said plane can be achieved with reduced effort, if a corresponding hollow structural element 822 has already been provided. Since only small cuts would be required in addition to enter the hollow structural element 822, the risk of damaging the core 81 of the optical fiber 8 could more easily be avoided.

The optical fiber 8 shown in FIG. 16c is provided with five hollow or massive structural elements 822, 822'
a) that are randomly distributed in the peripheral zone of the cladding region 82; and
b) that comprise a diameter of approximately 1/10 of the diameter of the optical fiber 8.

The results achieved with five structural elements 822, 822' with the described dimensions are very good. However the transfer of pump signals through the cladding 82 to the core can already be improved significantly with a single hollow or massive structural element 822, 822', which preferably is placed near the core 81 of the optical fiber 8 and provided with a larger diameter, e.g. in the range of 1/10-2/10 of the diameter of the fiber 8. In general with a lower number the structural elements 822, 822' are placed closer to the core 81 and provided with a larger diameter.

When present in a higher number, the structural elements 822, 822' must be randomly distributed and provided with a diameter closer to 1/10 of the diameter of the fiber 8.

For the production of the optical fibers 8 shown in FIG. 16a-16c, preforms 10 are provided which can advantageously be produced as illustrated in FIG. 17a-17e. The preforms are provided with corresponding hollow or massive structural elements 122; 122' according to the methods described below.

With one method massive structural elements 122' are introduced into the second silica tube 111 before the silica grain 510 or an $SiO_2$-A/A mixture 58 is poured into the silica tube 111. The massive structural element 122' consists of pure silica or silica that has been doped to achieve laser activity and/or a desired refractive index. Subsequently the silica tube 111, the silica grain 510 or the $SiO_2$-A/A mixture 58 and the massive structural element 122' are fused in a furnace 23 as described above.

Alternatively at least one removable rod 101, preferably consisting of carbon, is introduced into the second silica tube 111 before the silica grain 510 or an $SiO_2$-A/A mixture 58 is poured into the silica tube 111. After the preform had been processed in the furnace 23 the rod 101 is removed, leaving a hollow structural element 122.

FIG. 17a shows the assembly of a preform 10 designed for producing optical fibers 8 according to FIGS. 16a and 16b. A massive structural element 122' with desired dimensions, particularly a plane oriented towards the core region, is inserted together with a first preform 1, 1' into a secondary silica tube 111, which is then filled with silica grain or with or without A/A particles. After the preform 10 has been processed in a furnace 23, the massive structural element 122' remains fused within the processed preform 10. In the event that a hollow structural element would be desired a removable rod would be applied as described below.

Figure 17B:
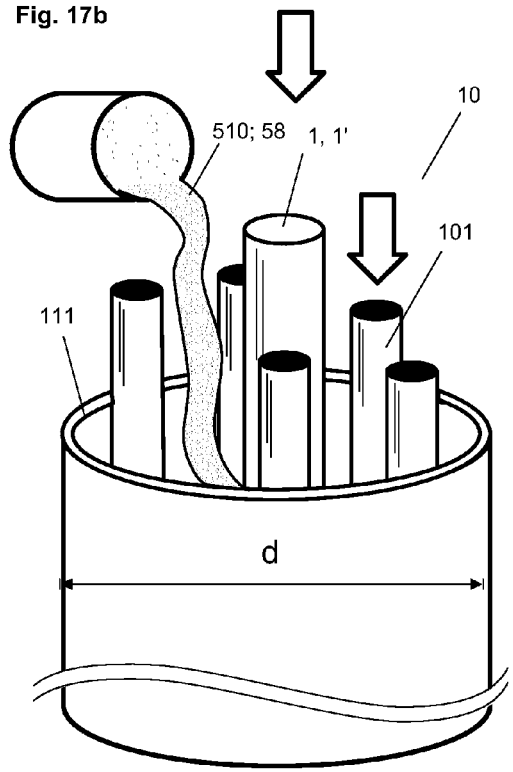
Figure 17C:
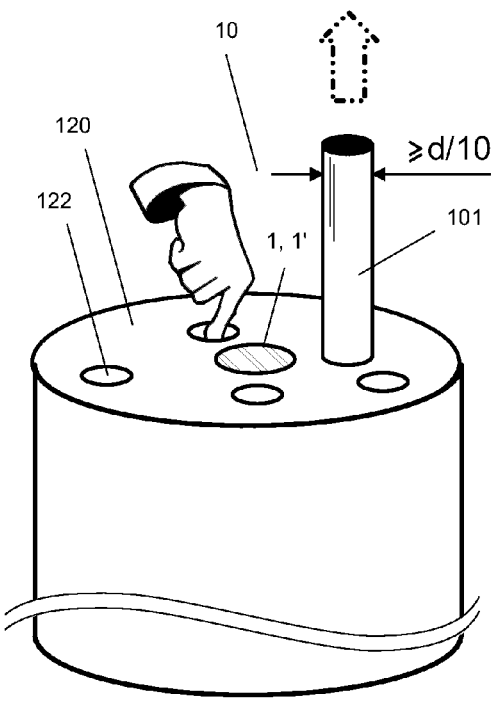

FIG. 17b shows the assembly of a preform 10 designed for producing optical fibers 8 according to FIG. 16c that are provided with hollow structural elements 822. In this example five removable rods 101 are inserted together with a first preform 1, 1' into a secondary silica tube 111 before the grain 510 or the mixture 58 is entered. After the preform 10 has been processed in a furnace 23 the rods 101 are removed, as illustrated in FIG. 17c, leaving the massive core 1, 1' and five hollow structural elements 122 in the processed preform 10.

Figure 17D:
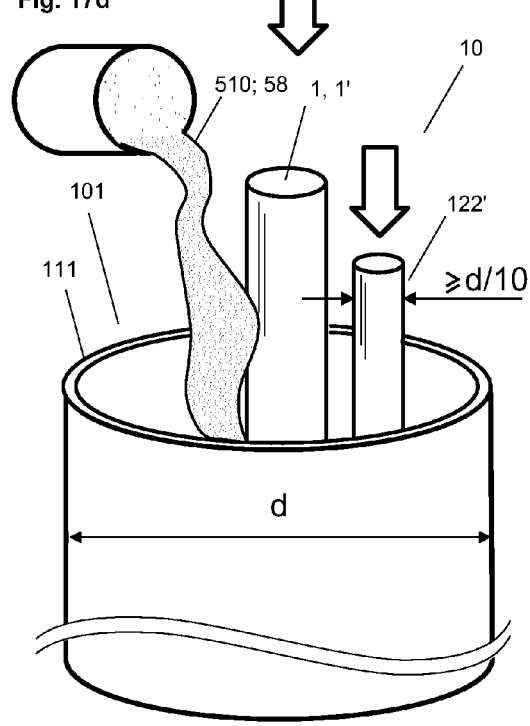
Figure 17E:
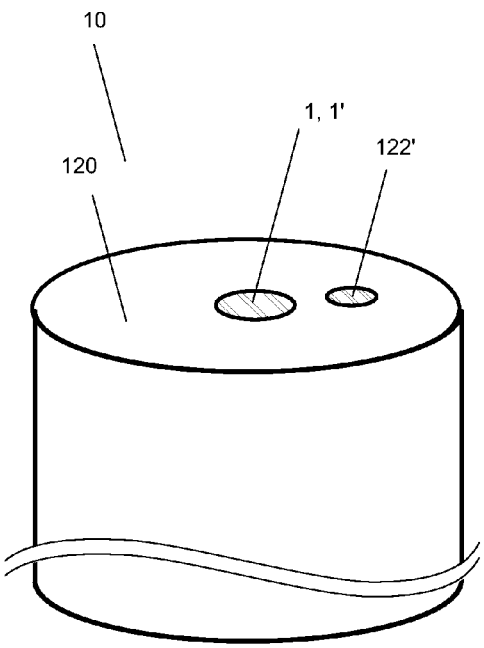

FIG. 17d shows the assembly of a preform 10 designed for producing an optical fiber 8 according to FIG. 16c that is however provided with one massive structural element 822' only. In this example only one massive structural element 122' is inserted together with a first preform 1, 1' into a secondary silica tube 111 before the grain 510 or the mixture 58 is entered. After the preform 10 has been processed in a furnace 23 the massive structural element 122' remains fused within the processed preform 10, as illustrated in FIG. 17e.

The preforms described above can individually be designed, combined or interleaved as required by applicant. Inventive primary preforms can be inserted or integrated in a secondary preform. Secondary preforms can be integrated in a higher order preform, i.e. a ternary preform which comprises at least one secondary preform. The primary or secondary preforms contained in a ternary preform can, as an example, be dedicated to different applications such as the transfer of user signals in different wavelength regions or the transfer of pump signals. The lower order, e.g. primary or secondary, preforms can be inserted into the higher order, e.g. ternary, preform before or after processing, i.e. the performance of the heating process. The complete structure of a higher order, e.g. ternary preform, comprising numerous doped or un-doped primary, secondary or higher order silica tubes can however also be established in one step. In a further step the silica tubes can individually be filled with suitably doped grains or mixtures in order to obtain desired refractive indices or laser activities in selected zones of the higher order preform.

REFERENCES

[1] Mool C. Gupta, Handbook of PHOTONICS, CRC Press, 1997 Boca Raton, chapter 10.7, pages 445-449
[2] John Beynon, Introductory University Optics, Prentice Hall 1996
[3] Michel J. F. Digonnet, Rare-Earth-Doped Fiber Lasers and Amplifiers, $2^{nd}$ Edition, Marcel Dekker Inc. 2001
[4] WO 2005/102946 A1
[5] WO2005/102947 A1
[6] GB 2176472
[7] U.S. Pat. No. 5,572,618
[8] WO 98/58884

The invention claimed is:

1. A method for fabricating a preform for use in manufacturing an optical fiber that has least one core, the method comprising:
    pouring $SiO_2$-particles into an interior space of a silica tube, the silica tube having an interior space that is limited at a lower end thereof by a closure made of a porous material such as porous glass;
    introducing a flow of a gas selected from the group consisting of oxygen ($O_2$), helium (He), chloride ($Cl_2$) and fluorine (F), through the closure and through the $SiO_2$-particles contained in the silica tube;
    heating the silica tube to a temperature below the vitrification temperature of the silica tube in order to purify and calcinate the $SiO_2$-particles;
    attaching an adjoiner to an upper end of the silica tube;
    generating a reduced pressure within the interior space of the silica tube; and
    heating at least a bottom portion of the silica tube to a temperature above the vitrification temperature of the silica tube in order to fuse the silica tube and the $SiO_2$-particles.

2. The method according to claim 1, wherein a heating temperature in the step of heating the silica tube is about 1200° C.

3. A method for fabricating a preform for use in manufacturing an optical fiber that has least one core, the method comprising:
    pouring a mixture of $SiO_2$-particles and amplification/attenuation (A/A) particles into an interior space of a silica tube, the interior space of the silica tube being limited at a lower end thereof by a closure made of a porous material such as porous glass;
    introducing a flow of a gas selected from the group consisting of oxygen ($O_2$), helium (He), chloride ($Cl_2$) and fluorine (F), through the closure and through the $SiO_2$-A/A mixture contained in the silica tube;
    heating the silica tube in order to purify and calcinate the $SiO_2$-A/A mixture to a temperature below the vitrification temperature of the silica tube;
    attaching an adjoiner to an upper end of the silica tube;
    generating a reduced pressure within the interior space of the silica tube; and
    heating at least the bottom portion of the silica tube to a temperature above the vitrification temperature of the silica tube in order to fuse the silica tube and the $SiO_2$-A/A mixture.

4. The method according to claim 3, wherein a heating temperature in the step of heating the silica tube is about 1200° C.

5. A method for fabricating a preform for use in manufacturing an optical fiber that has least one core, the method comprising:
    mixing $SiO_2$ in the form of soot, solubility aid-particles, amplification/attenuation particles (A/A particles), and a liquid to obtain a slurry, the slurry comprising,
        80%-98% atomic weight, $SiO_2$-particles,
        0.5%-2.5% atomic weight, A/A-particles, and
        1.5%-7.5% atomic weight, solubility aid-particles,
    drying the slurry at a temperature in the range of 80° C. to 120° C.,
    applying a mechanical impact to the dried slurry, to obtain a pulverised $SiO_2$-A/A mixture;
    disposing the pulverized $SiO_2$-A/A mixture into an interior space of a silica tube, the interior space of the silica tube being limited at a lower end thereof by a closure made of a porous material such as porous glass;
    introducing a flow of a gas selected from the group consisting of oxygen ($O_2$), helium (He), chloride ($Cl_2$) and fluorine (F), through the closure and through the pulverized $SiO_2$-A/A mixture contained in the silica tube;
    generating a reduced pressure within the interior space; and
    heating at least the bottom portion of the silica tube to fuse the silica tube and the pulverised $SiO_2$-A/A mixture.

* * * * *